US 7,259,219 B2

(12) United States Patent
Rosen et al.

(10) Patent No.: US 7,259,219 B2
(45) Date of Patent: Aug. 21, 2007

(54) LOW MOLECULAR WEIGHT COPOLYMER OF ETHYLENE AND VINYL AROMATIC MONOMER AND USES THEREOF

(75) Inventors: Robert K. Rosen, Houston, TX (US); Teresa P. Karjala, Lake Jackson, TX (US); Selim Yalvac, Missouri City, TX (US); Yunwa W. Cheung, Lake Jackson, TX (US); Martin J. Guest, Rheinmunster (DE); Brian W. S. Kolthammer, Lake Jackson, TX (US); Steven M. Ueligger, Angleton, TX (US)

(73) Assignee: Dow Global Technologies Inc., Midland, MI (US)

( * ) Notice: Subject to any disclaimer, the term of this patent is extended or adjusted under 35 U.S.C. 154(b) by 418 days.

(21) Appl. No.: 10/509,212

(22) PCT Filed: Apr. 9, 2003

(86) PCT No.: PCT/US03/10844

§ 371 (c)(1),
(2), (4) Date: Sep. 24, 2004

(87) PCT Pub. No.: WO03/087178

PCT Pub. Date: Oct. 23, 2003

(65) Prior Publication Data

US 2005/0165192 A1    Jul. 28, 2005

Related U.S. Application Data

(60) Provisional application No. 60/372,495, filed on Apr. 12, 2002.

(51) Int. Cl.
*C08F 12/06* (2006.01)
*C08F 12/08* (2006.01)

(52) U.S. Cl. .................. 526/346; 526/348; 526/352
(58) Field of Classification Search ............ 526/346, 526/348, 352
See application file for complete search history.

(56) References Cited

U.S. PATENT DOCUMENTS 3,271,121 A    9/1966   Young
5,955,557 A *  9/1999   Machida et al. ............ 526/346
6,169,154 B1 * 1/2001   Machida et al. ............ 526/352
6,194,114 B1   2/2001   Toyoda

FOREIGN PATENT DOCUMENTS

| DE | 198 50 243 A | 5/2000 |
|----|--------------|--------|
| EP | 0373 879 A | 6/1990 |
| EP | 0 727 446 A | 8/1996 |
| EP | 0 896 983 A | 2/1999 |
| FR | 914 371 A | 10/1946 |
| FR | 1 480 529 A | 5/1967 |
| JP | 2000-038418 | * 2/2000 |
| JP | 2001-002731 | * 1/2001 |
| WO | WO-89 12651 A | 12/1989 |
| WO | WO-98 09999 A | 3/1998 |
| WO | WO-99 20691 A | 4/1999 |
| WO | WO-00 46258 A | 8/2000 |
| WO | WO-01 98377 A | 12/2001 |

OTHER PUBLICATIONS

Database WPI; Section Ch, Week 198447, Derwent Publications Ltd., London, BG; AN 1984-290773, XP002248936.
Database WPI; JP 59 045308 A (Mitsubishi Chem. Ind. Ltd.), (Mar. 14, 1984) abstract.

* cited by examiner

*Primary Examiner*—Ling-Sui Choi

(57) ABSTRACT

An article of manufacture comprises a copolymer of ethylene and vinyl aromatic monomer having a molecular weight of less than 15,000. Preferably, the copolymer is characterized by a backbone having a first and second terminal end group, the first terminal end group is a methyl group, the second terminal end group is a vinyl group, wherein the ratio of the terminal methyl group to the terminal vinyl group is 0.8:1 to 1:0.8. The article of manufacture includes, but is not limited to, waxes, lubricants, additives, etc. The waxes may be used to formulate paints and coatings, printing inks, carbon paper, photo toners, building and construction materials, mold release agents, hot melt adhesives, candles. The waxes may also be used in wood processing, metal working, powder metallurgy and sintering, wax modeling, sizing, crop protection, and so on.

14 Claims, No Drawings

LOW MOLECULAR WEIGHT COPOLYMER OF ETHYLENE AND VINYL AROMATIC MONOMER AND USES THEREOF

The invention relates to an article of manufacture comprising a copolymer of ethylene and vinyl aromatic monomer and various applications thereof.

Hydrocarbon waxes are widely used in a variety of applications such as in printing inks, processing aids, mould release agents, candles, polishes and particularly in coatings and adhesives. In particular, highly crystalline waxes are attracting increasing interest for admixing to produce abrasion-resistant printing inks, for paint flatting and for the preparation of emulsifiable waxes for cleaning materials. An important application is in hot melt systems, particularly hot melt coatings and hot melt adhesives. In general, paraffin waxes or microcrystalline waxes are used in such hot melt applications, but paraffin waxes and soft microcrystalline waxes both have relatively low melting points. Hard microcrystalline waxes have higher melting points but are relatively expensive and have high viscosity. In some systems they also give rise to incompatibility problems.

Various synthetic techniques are used for preparing waxes. The well-known Fischer-Tropsch process produces waxy products, but these materials tend to have a higher molecular weight "tail" than paraffin waxes which affects their properties. Waxes are also prepared by degradation of higher molecular weight polyethylenes to obtain waxes with the desired molecular weight. A further possibility is to prepare waxes directly by polymerization of ethylene or propylene. Atactic polypropylene waxes tend to be sticky which results in handling difficulties, and in some systems these waxes are incompatible. Polyethylene waxes have in the past tended to be of higher molecular weight and thus higher viscosity than is required for many applications.

As generally known to those of skill in the art of olefin polymerization, styrene is generally a relatively more difficult comonomer to incorporate into an ethylene-α-olefin copolymer during copolymerization as compared with 1-hexene or 1-octene. See, for example, Carlini et al., Polymer 42 (2001) 5069-5078 ("The copolymerization of styrene with α-olefins by conventional Ziegler-Natta catalysts has been reported to occur with severe limitations."). Moreover, most known ethylene styrene copolymers are directed toward polymers where the styrene is present in a chain terminating position (see, for example, U.S. Pat. Nos. 3,390,141 and 5,180,872 and Pellecchia et al., Macromolecules, 2000, 33, 2807-2814 and EP 0 526 943). Consequently, there remains a need to explore synthetic methods for making a lower molecular weight ethylene styrene copolymer and to identify various applications for such a copolymer.

The above need is met by one or more of the following aspects of the invention. In one aspect, the invention relates to an article of manufacture comprising a copolymer of ethylene and vinyl aromatic monomer having a molecular weight of less than 15,000. In some embodiments, the copolymer is characterized by a backbone having a first and second terminal end group, the first terminal end group is a methyl group, the second terminal end group is a vinyl group, wherein the ratio of the terminal methyl group to the terminal vinyl group is 0.8:1 to 1:0.8. Optionally, the backbone of the copolymer is substantially free of a vinylidene group. The article of manufacture includes, but is not limited to, waxes, lubricants, additives, etc. The waxes may be used to formulate paints and coatings, printing inks, carbon paper, photo toners, building and construction materials, mold release agents, hot melt adhesives, candles. The waxes may also be used in wood processing, metal working, powder metallurgy and sintering, wax modeling, sizing, crop protection, and so on. In some embodiments, the copolymer includes a functional group, such as a halogen, hydroxyl, anhydride, amine, amide, carboxylic acid, ester, ether, or nitrile group.

In another aspect, the invention relates to a method of functionalizing a polymer. The method comprises (a) obtaining a copolymer of ethylene and vinyl aromatic monomer having a molecular weight of less than 15,000, the copolymer being characterized by a backbone having a first and second terminal end group, the first terminal end group being a methyl group, the second terminal end group being a vinyl group, wherein the ratio of the terminal methyl group to the terminal vinyl group is 0.8:1 to 1:0.8; and (b) effectuating functionalization of the vinyl group to make a functionalized copolymer. The functionalization includes, but is not limited to, chlorination, epoxidation, oxidation, carboxylation, sulfonation and so on.

Additional aspects of the invention and the advantages of the invention are apparent with the following description.

Embodiments of the invention provide a method of making a low molecular weight copolymer of ethylene vinyl aromatic monomer ("EVAM copolymer") and applications thereof. Examples of suitable applications of the low molecular EVAM copolymer include, but are not limited to, waxes, lubricants, additives, etc. The waxes may be used to formulate paints and coatings, printing inks, carbon paper, photo toners, building and construction materials, mold release agents, hot melt adhesives, candles. The waxes may also be used in wood processing, metal working, powder metallurgy and sintering, wax modeling, sizing, crop protection, and so on.

In the following description, all numbers disclosed herein are approximate values, regardless whether the word "about" or "approximately" is used in connection therewith. They may vary by up to 1 percent, 2 percent, 5 percent, or sometimes 10 to 20 percent. Whenever a numerical range with a lower limit, $R_L$, and an upper limit $R_U$, is disclosed, any number R falling within the range is specifically disclosed. In particular, the following numbers R within the range are specifically disclosed: $R=R_L+k*(R_U-R_L)$, wherein k is a variable ranging from 1 percent to 100 percent with a 1 percent increment, that is k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two numbers, R, as defined in the above is also specifically disclosed.

The term "polymer" as used herein refers to a macromolecular compound prepared by polymerizing monomers of the same or a different type. A polymer refers to homopolymers, copolymers, terpolymers, interpolymers, and so on. The term "interpolymer" used herein refers to polymers prepared by the polymerization of at least two types of monomers or comonomers. It includes, but is not limited to, copolymers (which usually refers to polymers prepared from two different monomers or comonomers), terpolymers (which usually refers to polymers prepared from three different types of monomers or comonomers), and tetrapolymers (which usually refers to polymers prepared from four different types of monomers or comonomers), and the like. The term "monomer" or "comonomer" refers to any compound with a polymerizable moiety which is added to a reactor in order to produce a polymer.

The term "low molecular weight" refers to a weight average molecular weight of less than 30,000, preferably less than 15,000, 12,000, or 10,000. However, the weight average molecular weight should be greater than about 300, preferably greater than 400. In some embodiments, ultra low molecular weight polymers are prepared. The term "ultra low molecular weight" refers to a weight average molecular weight of less than about 3,000. To be considered as a copolymer or interpolymer, it should include at least two repeating units, preferably three, four, five, six, seven, or more. In some embodiments, the copolymer or interpolymer includes at least ten repeating units. The molecular weight distribution (MWD), which is the ratio of weight average molecular weight, $M_w$, over number average molecular weight, $M_n$, generally is between 1.1 and 6, preferably between 1.1 to 4, between 1.1 to 3, or between 1.1 to 2.5. In some embodiments, the MWD is less than about 2. In addition, the polymers disclosed herein generally possess an intrinsic viscosity (as measured in tetralin at 135° C.) of between 0.025 and 0.9 dl/g, preferably of between 0.05 and 0.5 dl/g, most preferably of between 0.075 and 0.4 dl/g.

The low molecular weight copolymers or interpolymers may have various characteristics which are described below.

As used herein, the phrase "characterized by the formula" is not intended to be limiting and is used in the same way that "comprising" is commonly used. The term "independently selected" is used herein to indicate that the R groups, for example, $R^1$, $R^2$, $R^3$, $R^4$, and $R^5$ can be identical or different (for example $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (for example, a hexane solvent, includes hexanes). A named R group will generally have the structure that is recognized in the art as corresponding to R groups having that name. The terms "compound" and "complex" are generally used interchangeably in this specification, but those of skill in the art may recognize certain compounds as complexes and vice versa. For the purposes of illustration, representative certain groups are defined herein. These definitions are intended to supplement and illustrate, not preclude, the definitions known to those of skill in the art. Also as used herein "styrene" is intended to include substituted versions of styrene, such as para-t-butylstyrene.

"Hydrocarbyl" refers to univalent hydrocarbyl radicals containing 1 to 30 carbon atoms, preferably 1 to 24 carbon atoms, most preferably 1 to 12 carbon atoms, including branched or unbranched, saturated or unsaturated species, such as alkyl groups, alkenyl groups, aryl groups, and the like. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom.

The term "alkyl" is used herein to refer to a branched or unbranched, saturated or unsaturated acyclic hydrocarbon radical. Suitable alkyl radicals include, for example, methyl, ethyl, n-propyl, i-propyl, 2-propenyl (or allyl), vinyl, n-butyl, t-butyl, i-butyl (or 2-methylpropyl), etc. In particular embodiments, alkyls have between 1 and 200 carbon atoms, between 1 and 50 carbon atoms or between 1 and 20 carbon atoms.

"Substituted alkyl" refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, alkylhalos (for example, $CF_3$), hydroxy, amino, phosphido, alkoxy, amino, thio, nitro, and combinations thereof. Suitable substituted alkyls include, for example, benzyl, trifluoromethyl and the like.

The term "heteroalkyl" refers to an alkyl as described above in which one or more hydrogen atoms to any carbon of the alkyl is replaced by a heteroatom selected from the group consisting of N, O, P, B, S, Si, Sb, Al, Sn, As, Se and Ge. This same list of heteroatoms is useful throughout this specification. The bond between the carbon atom and the heteroatom may be saturated or unsaturated. Thus, an alkyl substituted with a heterocycloalkyl, substituted heterocycloalkyl, heteroaryl, substituted heteroaryl, alkoxy, aryloxy, boryl, phosphino, amino, silyl, thio, or seleno is within the scope of the term heteroalkyl. Suitable heteroalkyls include cyano, benzoyl, 2-pyridyl, 2-furyl and the like.

The term "cycloalkyl" is used herein to refer to a saturated or unsaturated cyclic non-aromatic hydrocarbon radical having a single ring or multiple condensed rings. Suitable cycloalkyl radicals include, for example, cyclopentyl, cyclohexyl, cyclooctenyl, bicyclooctyl, etc. In particular embodiments, cycloalkyls have between 3 and 200 carbon atoms, between 3 and 50 carbon atoms or between 3 and 20 carbon atoms.

"Substituted cycloalkyl" refers to cycloalkyl as just described including in which one or more hydrogen atom to any carbon of the cycloalkyl is replaced by another group such as a halogen, alkyl, substituted alkyl, aryl, substituted aryl, cycloalkyl, substituted cycloalkyl, heterocycloalkyl, substituted heterocycloalkyl, heteroaryl, substituted heteroaryl, alkoxy, aryloxy, boryl, phosphino, amino, silyl, thio, seleno and combinations thereof. Suitable substituted cycloalkyl radicals include, for example, 4-dimethylaminocyclohexyl, 4,5-dibromocyclohept-4-enyl, and the like.

The term "heterocycloalkyl" is used herein to refer to a cycloalkyl radical as described, but in which one or more or all carbon atoms of the saturated or unsaturated cyclic radical are replaced by a heteroatom such as nitrogen, phosphorous, oxygen, sulfur, silicon, germanium, selenium, or boron. Suitable heterocycloalkyls include, for example, piperazinyl, morpholinyl, tetrahydropyranyl, tetrahydrofuranyl, piperidinyl, pyrrolidinyl, oxazolinyl and the like.

"Substituted heterocycloalkyl" refers to heterocycloalkyl as just described including in which one or more hydrogen atom to any atom of the heterocycloalkyl is replaced by another group such as a halogen, alkyl, substituted alkyl, aryl, substituted aryl, heteroaryl, substituted heteroaryl, alkoxy, aryloxy, boryl, phosphino, amino, silyl, thio, seleno and combinations thereof. Suitable substituted heterocycloalkyl radicals include, for example, N-methylpiperazinyl, 3-dimethylaminomorpholinyl and the like.

The term "aryl" is used herein to refer to an aromatic substituent, which may be a single aromatic ring or multiple aromatic rings, which are fused together, linked covalently, or linked to a common group such as a methylene or ethylene moiety. The aromatic ring(s) may include phenyl, naphthyl, anthracenyl, and biphenyl, among others. In particular embodiments, aryls have between 1 and 200 carbon atoms, between 1 and 50 carbon atoms or between 1 and 20 carbon atoms.

"Substituted aryl" refers to aryl as just described in which one or more hydrogen atom bound to any carbon is replaced by one or more functional groups such as alkyl, substituted alkyl, cycloalkyl, substituted cycloalkyl, heterocycloalkyl, substituted heterocycloalkyl, halogen, alkylhalos (for example, $CF_3$), hydroxy, amino, phosphido, alkoxy, amino, thio, nitro, and both saturated and unsaturated cyclic hydrocarbons which are fused to the aromatic ring(s), linked covalently or linked to a common group such as a methylene or ethylene moiety. The common linking group may also be a carbonyl as in benzophenone or oxygen as in diphenylether or nitrogen in diphenylamine.

The term "heteroaryl" as used herein refers to aromatic rings in which one or more carbon atoms of the aromatic ring(s) are replaced by a heteroatom(s) such as nitrogen, oxygen, boron, selenium, phosphorus, silicon or sulfur. Heteroaryl refers to structures that may be a single aromatic ring, multiple aromatic ring(s), or one or more aromatic rings coupled to one or more non-aromatic ring(s). In structures having multiple rings, the rings can be fused together, linked covalently, or linked to a common group such as a methylene or ethylene moiety. The common linking group may also be a carbonyl as in phenyl pyridyl ketone. As used herein, rings such as thiophene, pyridine, isoxazole, pyrazole, pyrrole, furan, etc. or benzo-fused analogues of these rings are defined by the term "heteroaryl."

"Substituted heteroaryl" refers to heteroaryl as just described including in which one or more hydrogen atoms bound to any atom of the heteroaryl moiety is replaced by another group such as a halogen, alkyl, substituted alkyl, aryl, substituted aryl, heteroaryl, substituted heteroaryl, alkoxy, aryloxy, boryl, phosphino, amino, silyl, thio, seleno and combinations thereof. Suitable substituted heteroaryl radicals include, for example, 4-N,N-dimethylaminopyridine.

The term "alkoxy" is used herein to refer to the $-OZ^1$ radical, where $Z^1$ is selected from the group consisting of alkyl, substituted alkyl, cycloalkyl, substituted cycloalkyl, heterocylcoalkyl, substituted heterocycloalkyl, silyl groups and combinations thereof as described herein. Suitable alkoxy radicals include, for example, methoxy, ethoxy, benzyloxy, t-butoxy, etc. A related term is "aryloxy" where $Z^1$ is selected from the group consisting of aryl, substituted aryl, heteroaryl, substituted heteroaryl, and combinations thereof. Examples of suitable aryloxy radicals include phenoxy, substituted phenoxy, 2-pyridinoxy, 8-quinalinoxy and the like.

As used herein the term "silyl" refers to the $-SiZ^1Z^2Z^3$ radical, where each of $Z^1$, $Z^2$, and $Z^3$ is independently selected from the group consisting of hydrogen, alkyl, substituted alkyl, cycloalkyl, heterocycloalkyl, heterocyclic, aryl, substituted aryl, heteroaryl, substituted heteroaryl, alkoxy, aryloxy, amino, silyl and combinations thereof.

As used herein the term "boryl" refers to the $-BZ^1Z^2$ group, where each of $Z^1$ and $Z^2$ is independently selected from the group consisting of hydrogen, alkyl, substituted alkyl, cycloalkyl, heterocycloalkyl, heterocyclic, aryl, substituted aryl, heteroaryl, substituted heteroaryl, alkoxy, aryloxy, amino, silyl and combinations thereof.

As used herein, the term "phosphino" refers to the group $-PZ^1Z^2$, where each of $Z^1$ and $Z^2$ is independently selected from the group consisting of hydrogen, substituted or unsubstituted alkyl, cycloalkyl, heterocycloalkyl, heterocyclic, aryl, substituted aryl, heteroaryl, silyl, alkoxy, aryloxy, amino and combinations thereof.

As used herein, the term "phosphine" refers to the group: $PZ^1Z^2Z^3$, where each of $Z^1$, $Z^3$ and $Z^2$ is independently selected from the group consisting of hydrogen, substituted or unsubstituted alkyl, cycloalkyl, heterocycloalkyl, heterocyclic, aryl, substituted aryl, heteroaryl, silyl, alkoxy, aryloxy, amino and combinations thereof.

The term "amino" is used herein to refer to the group $-NZ^1Z^2$, where each of $Z^1$ and $Z^2$ is independently selected from the group consisting of hydrogen, alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl and combinations thereof.

The term "amine" is used herein to refer to the group: $NZ^1Z^2Z^3$, where each of $Z^1$, $Z^2$ and $Z^3$ is independently selected from the group consisting of hydrogen, alkyl, substituted alkyl, cycloalkyl, substituted cycloalkyl, heterocycloalkyl, substituted heterocycloalkyl, aryl (including pyridines), substituted aryl, heteroaryl, substituted heteroaryl, alkoxy, aryloxy, silyl and combinations thereof.

The term "thio" is used herein to refer to the group $-SZ^1$, where $Z^1$ is selected from the group consisting of hydrogen, alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl and combinations thereof.

The term "seleno" is used herein to refer to the group $-SeZ^1$, where $Z^1$ is selected from the group consisting of hydrogen, alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl and combinations thereof.

The term "halo" refers to Cl, F, Br or I bonded to a carbon and "halide" refers to Cl, F, Br or I bonded to a metal.

The term "saturated" refers to lack of double and triple bonds between atoms of a radical group such as ethyl, cyclohexyl, pyrrolidinyl, and the like.

The term "unsaturated" refers to the presence one or more double and triple bonds between atoms of a radical group such as vinyl, acetylide, oxazolinyl, cyclohexenyl, acetyl and the like.

The term "substantially random" (in the substantially random interpolymer comprising polymeric units derived from one or more α-olefin monomers with one or more vinyl aromatic monomers and/or aliphatic or cycloaliphatic vinyl or vinylidene monomers) as used herein means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71-78. Preferably, substantially random interpolymers do not contain more than 15 percent of the total amount of vinyl aromatic monomer in blocks of vinyl aromatic monomer of more than 3 units. More preferably, the interpolymer is not characterized by a high degree of either isotacticity or syndiotacticity. This means that in the carbon $^{13}$NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Substantially Random Interpolymers

In some embodiments, the low molecular weight copolymers or interpolymers are substantially random olefin interpolymer which comprises:

(1) first polymeric units derived from:
(i) at least one vinyl aromatic monomer, or
(ii) at least one aliphatic or cycloaliphatic vinyl or vinylidene monomer, or
(iii) a combination of at least one aromatic vinyl monomer and at least one aliphatic or cycloaliphatic vinyl or vinylidene monomer, and
(2) second polymeric units derived from at least one $C_{2-20}$ α-olefin; and optionally (3) third polymeric units derived from one or more ethylenically unsaturated polymerizable monomers other than those of (1) and (2).

The first polymeric units may be present in the interpolymer in any amount, such as from 0.5 mol. percent to 99.5 mol. percent, from 5 mol. percent to 90 mol. percent; from 10 mol. percent to 75 mol. percent; from 1 mol. percent to 50 mol. percent; from 10 mol. percent to 45 mol. percent; or from 5 mol. percent to 35 mol. percent. Preferably, the first polymeric units are present in an amount of 50 mol. percent or less. Similarly, the second polymeric unit may be present in the interpolymer in the above ranges. In some embodiments, the second polymeric units are present in an amount of 50 mol. percent or higher. In other embodiments, the second polymeric units are present in an amount higher than the first polymeric units. The third polymeric units are optional and may be present up to 50 mol. percent, preferably up to 40 mol. percent, up to 30 mol. percent, up to 20 mol. percent, up to 10 mol. percent, or up to 5 mol. percent.

Suitable α-olefins include for example, α-olefins containing from 2 to 20, preferably from 2 to 12, more preferably from 2 to 8 carbon atoms. Particularly suitable are ethylene, propylene, butene-1, 4-methyl-1-pentene, hexene-1 or octene-1 or ethylene in combination with one or more of propylene, butene-1, 4-methyl-1-pentene, hexene-1 or octene-1. These α-olefins do not contain an aromatic moiety.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

Suitable vinyl aromatic monomers which can be employed to prepare the interpolymers include, for example, those represented by the following formula:

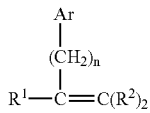

wherein $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; the two $R^2$ groups can be the same or different groups. Ar is a phenyl group or a phenyl group substituted with from 1 to 5 substituents selected from the group consisting of halo, $C_{1-4}$-alkyl, and $C_{1-4}$-haloalkyl; and n has a value from zero to 4, preferably from zero to 2, most preferably zero. Exemplary monovinyl aromatic monomers include styrene, vinyl toluene, α-methylstyrene, t-butyl styrene, chlorostyrene, including all isomers of these compounds, and the like. Particularly suitable monomers include styrene and lower alkyl- or halogen-substituted derivatives thereof. Preferred monomers include styrene, α-methyl styrene, the lower alkyl-($C_1$-$C_4$) or phenyl-ring substituted derivatives of styrene, such as ortho-, meta-, and para-methylstyrene, the ring halogenated styrenes, para-vinyl toluene or mixtures thereof, and the like. A more preferred aromatic monovinyl monomer is styrene.

By the term "aliphatic or cycloaliphatic vinyl or vinylidene compounds", it is meant addition polymerizable vinyl or vinylidene monomers corresponding to the formula:

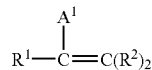

wherein $A^1$ is a sterically bulky, aliphatic or cycloaliphatic substituent of up to 20 carbons, $R^1$ is selected from the group of radicals consisting of hydrogen and alkyl radicals containing from 1 to 4 carbon atoms, preferably hydrogen or methyl; alternatively $R^1$ and $A^1$ together may form a ring system. Each $R^2$ is independently selected from the group of radicals consisting of hydrogen and alkyl radicals containing from 1 to 4 carbon atoms, preferably hydrogen or methyl; the two $R^2$ groups can be the same or different groups. Preferred aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

The substantially random interpolymers can be prepared as described in EP-A-0,416,815 by James C. Stevens et al. and U.S. Pat. No. 5,703,187 by Francis J. Timmers. Such a method of preparation of the substantially random interpolymers includes polymerizing a mixture of polymerizable monomers in the presence of one or more metallocene or constrained geometry catalysts in combination with various cocatalysts. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization. Additional methods are disclosed in U.S. Pat. No. 6,344,515.

Examples of suitable catalysts and methods for preparing the substantially random interpolymers are disclosed in EP-A-514,828; as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185.

The substantially random α-olefin/vinyl aromatic interpolymers can also be prepared by the methods described in JP 07/278,230 employing compounds shown by the general formula

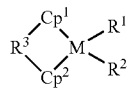

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1-12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$).

The substantially random α-olefin/vinyl aromatic interpolymers can also be prepared by the methods described by John G. Bradfute et al. (W. R Grace & Co.) in WO 95/32095; by R. B. Pannell (Exxon Chemical Patents, Inc.) in WO 94/00500; and in *Plastics Technology*, p. 25 (September 1992).

Also suitable are the substantially random interpolymers which comprise at least one α-olefin/vinyl aromatic/vinyl aromatic/α-olefin tetrad disclosed in WO 98/09999 by Francis J. Timmers, et al. These interpolymers contain additional signals in their carbon-13 NMR spectra with intensities greater than three times the peak to peak noise. These signals appear in the chemical shift range 43.70-44.25 ppm and 38.0-38.5 ppm. Specifically, major peaks are observed at 44.1, 43.9, and 38.2 ppm. A proton test NMR experiment indicates that the signals in the chemical shift region 43.70-44.25 ppm are methine carbons and the signals in the region 38.0-38.5 ppm are methylene carbons.

It is believed that these new signals are due to sequences involving two head-to-tail vinyl aromatic monomer insertions preceded and followed by at least one α-olefin insertion, for example an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon $^{13}$NMR peaks but with slightly different chemical shifts.

These interpolymers can be prepared by conducting the polymerization at temperatures of from −30° C. to 250° C. in the presence of such catalysts as those represented by the formula

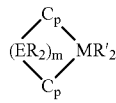

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to 30 preferably from 1 to 20 more preferably from 1 to 10 carbon or silicon atoms; each R' is independently, each occurrence, H, halo, hydrocarbyl, hyrocarbyloxy, silahydrocarbyl, hydrocarbylsilyl containing up to 30 preferably from 1 to 20 more preferably from 1 to 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

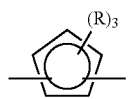

wherein each R is independently, each occurrence, H, hydrocarbyl, silahydrocarbyl, or hydrocarbylsilyl, containing up to 30 preferably from 1 to 20 more preferably from 1 to 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl)) zirconium dichloride, racemic-(dimethylsilanediyl)-bis-(2-methyl-4-phenylindenyl))zirconium 1,4-diphenyl-1,3-butadiene, racemic-(dimethylsilanediyl)-bis-(2-methyl-4-phenylindenyl))zirconium di-C1-4 alkyl, racemic-(dimethylsilanediyl)-bis-(2-methyl-4-phenylindenyl)) zirconium di-C1-4 alkoxide, or any combination thereof and the like.

It is also possible to use the following titanium-based constrained geometry catalysts, [N-(1,1-dimethylethyl)-1,1-dimethyl-1-[(1,2,3,4,5-η)-1,5,6,7-tetrahydro-s-indacen-1-yl]silanaminato(2-)-N]titanium dimethyl; (1-indenyl)(tert-butylamido)dimethyl-silane titanium dimethyl; ((3-tert-butyl)(1,2,3,4,5-η)-1-indenyl)(tert-butylamido) dimethylsilane titanium dimethyl; and ((3-iso-propyl)(1,2,3,4,5-η)-1-indenyl)(tert-butyl amido)dimethyl silane titanium dimethyl, [1-[(1,2,3,3a,11b-η)-1H-cyclopenta[1]phenanthren-2-yl]-N-(1,1-dimethylethyl)-1,1-dimethylsilanaminato(2-)-κN]dimethyl-titanium, [1-[(1,2,3,3a,12b-η)-2,8-dihydrodibenz[e,h]azulen-2-yl]-N-(1,1-dimethylethyl)-1,1-dimethylsilanaminato(2-)-κN]dimethyl titanium, or any combination thereof and the like.

Examples of additional suitable catalysts include, but are not limited to, dimethylmethylene bis(4,5-benz-1-indenyl) zirconium dichloride (another name: dimethylmethylenebis(benz-e-indenyl)zirconium dichloride), di-n-propylmethlenebis(4,5-benz-1-indenyl)zirconium dichloride, di-i-propylmethylenebis(4,5-benz-1-indenyl)zirconium dichloride, cyclohexylidenebis(4,5-benz-1-indenyl)zirconium dichloride, cyclopentylidenebis(4,5-benz-1-indenyl) zirconium dichloride, diphenylmethylenebis(4,5-benz-1-indenyl)zirconium dichloride, dimethylmethylene (cyclopentadienyl)(4,5-benz-1-indenyl)zirconium dichloride, dimethylmethylene(1-indenyl)(4,5-benz-1-indenyl)zirconium dichloride, dimethyl methylene(1-fluorenyl) (4,5-benz-1-indenyl)zirconium dichloride, dimethylmethylene(4-phenyl-1-indenyl)(4,5-benz-1-indenyl)zirconium dichloride, dimethylmethylene(4-naphthyl-1-indenyl)(4,5-benz-1-indenyl)zirconium dichloride, dimethylmethylenebis(5,6-benz-1-indenyl)zirconium dichloride, dimethylmethylene(5,6-benz-1-indenyl)(1-indenyl)zirconium dichloride, dimethylmethylenebis(4,7-benz-1-indenyl)zirconium dichloride, dimethyl methylene(6,7-benz-1-indenyl) (1-indenyl)zirconium dichloride, dimethylmethylene bis(4, 5-naphtho-1-indenyl)zirconium dichloride, dimethylmethylenebis(.alpha.-acetonaphtho-1-indenyl)zirconium dichloride, dimethylmethylenebis(3-cyclopenta(c) phenanthryl)zirconium dichloride, dimethylmethylene(3-cyclopenta(c)phenanthryl)(1-indenyl)zirconium dichloride, dimethylmethylenebis(1-cyclopenta(1)phenanthryl)zirconium dichloride, dimethylmethylene (1-cyclopenta(1) phenanthryl)(1-indenyl)zirconium dichloride, dimethylmethylenebis(4,5-benz-1-indenyl)zirconium bis (dimethylamide), and dimethylmethylene(1-indenyl)(4,5-benz-1-indenyl)zirconium bis(dimethylamide).

Suitable catalysts also include, are not limited to, dimethylmethylenebis(3-cyclopenta[c]phenanthryl)zirconium dichloride, di-n-propylmethylenebis(3-cyclopenta[c]phenanthryl)zirconium dichloride, di-i-propylmethylenebis(3-cyclopenta[c]phenanthryl)zirconium dichloride, cyclohexylidenebis(3-cyclopenta[c]phenanthryl)zirconium dichloride, cyclopentylidenebis(3-cyclopenta[c]phenanthryl)zirconium dichloride, diphenylinethylenebis(3-cylcopenta[c]phenanthryl)zirconium dichloride, dimethylmethylene(4,5-benzo-1-indenyl) (3-cylcopenta[c]phenanthryl) zirconium dichloride, dimethylmethylene(5,6-benzo-1-indenyl)(3-cyclopenta[c]phenanthryl)zirconium dichloride, dimethylmethylene(6,7-benzo-1-indenyl)(3-cyclopenta[c]phenanthryl)zirconium dichloride, dimethylmethylene(cyclopenta dienyl)(3-cyclopenta[c]phenanthryl)zirconium dichloride, dimethylmethylene (1-fluorenyl)(3-cyclopenta[c]phenanthryl)zirconium dichloride, dimethylmethylene(4-phenyl-1-indenyl)(3-cyclopenta[c]phenanthryl)zirconium dichloride, dimethylmethylene(4-naphthyl-1-indenyl)(3-cyclopenta[c]phenanthryl)zirconium dichloride, dimethylmethylene(3-cyclopenta[c]phenanthryl)(4,5-naphto-1-indenyl)zirconium dichloride, dimethylmethylene(3-cyclopenta[c]phenanthryl(.alpha.-acenaphto-1-indenyl)zirconium dichloride, dimethyl methylenebis(1-cyclopenta[1]phenanthryl)zirconium dichloride, di-n-propylmethylenebis(1-cyclopenta[1]phenanthryl)zirconium dichloride, di-i-propylmethylenebis(1-cyclopenta[1]phenanthryl)zirconium dichloride, cyclohexylidenebis(1-cyclopenta[1]phenanthryl)zirconium dichloride, cyclopentylidenebis(1-cyclopenta[1]phenanthryl)zirconium dichloride, diphenyl methylenebis (1-cyclopenta[1]phenanthryl)zirconium dichloride, diphenylmethylene (4,5-benzo-1-indenyl)(1-cyclopenta[1]phenanthryl)zirconium dichloride, diphenylmethylene(5,6-benzo-1-indenyl)(1-cyclopenta[1]phenanthryl)zirconium dichloride, diphenylmethylene(6,7-benzo-1-indenyl)(1-cyclopenta[1]phenanthryl)zirconium dichloride, methylmethylene (cyclopentadienyl)(1-cyclopenta[1]iphenanthryl)zirconium dichloride, dimethylmethylene(1-fluorenyl)(1-cyclopenta[1]phenanthryl)zirconium dichloride, dimethylmethylene(4-phenyl-1-indenyl)(1-cyclopenta[1]phenanthryl)zirconium dichloride, dimethylmethylene(4-naphthyl-1-indenyl)(1-cyclopenta[1]phenanthryl)zirconium dichloride, dimethylmethylene(1-cyclopenta [1]phenanthryl)(4,5-naphtho-1-indenyl)zirconium dichloride, dimethylmethylene (1-cyclopenta[1]phenanthryl)(.alpha.-acenaphtho-1-indenyl)zirconium dichloride, dimethyl methylene(1-cyclopenta[1]phenanthryl)(3-cyclopenta[c]phenanthryl) zirconium dichloride, and the like.

In the foregoing, zirconium complexes were exemplified, but corresponding titanium complexes and hafnium complexes may also suitably be used. Further, racemic-form or mixtures of racemic-form and meso-form may also be employed. Preferably, racemic-form or pseudo racemic-form are employed. In such a case, D-isomers or L-isomers may be employed.

Further preparative methods for the interpolymers used in embodiments of the invention have been described in the literature. Longo and Grassi (*Makromol. Chem.*, Volume 191, pages 2387 to 2396 [1990]) and D'Anniello et al. (Journal of Applied Polymer Science, Volume 58, pages 1701-1706 [1995]) reported the use of a catalytic system based on methylalumoxane (MAO) and cyclopentadienyltitanium trichloride (CpTiCl$_3$) to prepare an ethylene-styrene copolymer. Xu and Lin (*Polymer Preprints, Am. Chem. Soc. Div. Polym. Chem.*) Volume 35, pages 686, 687 [1994]) have reported copolymerization using a MgCl$_2$/TiCl$_4$/NdCl$_3$/Al (iBu)$_3$ catalyst to give random copolymers of styrene and propylene. Lu et al (*Journal of Applied Polymer Science*, Volume 53, pages 1453 to 1460 [1994]) have described the copolymerization of ethylene and styrene using a TiCl$_4$/NdCl$_3$/MgCl$_2$/Al(Et)$_3$ catalyst. Sernetz and Mulhaupt, (*Macromol. Chem. Phys.*, v. 197, pp. 1071-1083, 1997) have described the influence of polymerization conditions on the copolymerization of styrene with ethylene using Me$_2$Si (Me$_4$Cp)(N-tert-butyl)TiCl$_2$/methylaluminoxane Ziegler-Natta catalysts. Copolymers of ethylene and styrene produced by bridged metallocene catalysts have been described by Arai, Toshiaki and Suzuki (*Polymer Preprints, Am. Chem. Soc. Div. Polym. Chem.*) Volume 38, pages 349, 350 [1997]) and in U.S. Pat. No. 5,652,315, issued to Mitsui Toatsu Chemicals, Inc. The manufacture of α-olefin/vinyl aromatic monomer interpolymers such as propylene/styrene and butene/styrene are described in U.S. Pat. No. 5,244,996, issued to Mitsui Petrochemical Industries Ltd or U.S. Pat. No. 5,652,315 also issued to Mitsui Petrochemical Industries Ltd or as disclosed in DE 197 11 339 A1 to Denki KAGAKU Kogyo KK. While preparing the substantially random interpolymer, an amount of atactic vinyl aromatic homopolymer may be formed due to homopolymerization of the vinyl aromatic monomer at elevated temperatures. The presence of vinyl aromatic homopolymer is in general not detrimental and can be tolerated. The vinyl aromatic homopolymer may be separated from the interpolymer, if desired, by extraction techniques such as selective precipitation from solution with a non solvent for either the interpolymer or the vinyl aromatic homopolymer. It is preferred that no more than 30 weight percent, preferably less than 20 weight percent based on the total weight of the interpolymers of atactic vinyl aromatic homopolymer is present.

Interpolymers with Vinyl End Groups

In some embodiments, the copolymers or interpolymers are characterized by one methyl end group attached to one end of the polymeric chain and one vinyl end group attached to the other end of the polymeric chain, where the ratio of methyl to vinyl is at least 0.5, preferably 0.8 to 1.25 or 0.9 to 1.11. Some copolymers or interpolymers are substantially free of a vinylidene end group or a vinylidene structure in the polymeric chain. Such copolymers or interpolymers can be prepared by the methods disclosed in currently filed U.S. patent application entitled "Ethylene-Styrene Copolymers and Phenol-Triazole Type Complexes, Catalysts, and Processes for Polymerizing," with the following inventors: Oliver Brummer, Gary M. Diamond, Christopher Goh, Anne M. LaPointe, Margaret Leclere, James Longmire, and James A. W. Shoemaker, U.S. application Ser. No. 10/121,300, filed on Apr. 12, 2002.

In some embodiments, low molecular weight ethylene-styrene copolymers are prepared according to the methods disclosed in the above referenced currently filed patent application. The ethylene-styrene copolymers have a relatively low molecular weight (less than 10,000 and more specifically less than 5,000, less than 3,000 or less than 1,000) combined with a relatively narrow molecular weight distribution (less than 2.5 and more specifically less than 2.0) and end-group, determined by NMR end-group analysis that show a ratio of methyl to vinyl in the range of from 0.8:1 to 1:0.8 and more specifically 0.9:1 to 1:0.9. The molecular weights may be weight averages or number averages. The end-group analysis is performed using proton nuclear magnetic resonance (NMR) techniques, which are relatively well known to those of skill in the art. The scientific error in this method is 10-20 percent, given the ability to integrate the area under the peaks based on the relatively small peaks associated with the vinyl and methyl hydrogen atoms as compared to the much larger peaks associated with the hydrogen atoms from the backbone of the polymer as well as given the close proximity of the shifts of the large methylene and small methyl peaks in the NMR spectrum. As those of skill in the art will appreciate, the peaks might be integrated more accurately with higher power NMR equipment. End analysis was performed in the manner discussed in the examples herein. The molecular weight and polydispersity are determined using size exclusion chromatography according to methods known to those of skill in the art, such as relative to linear polystyrene standards. See U.S. Pat. Nos. 6,294,388, 6,260,407, 6,175,409, 6,296,771 and 6,265,226.

The copolymers also show that the styrene monomer(s) incorporated into the chain do not lie just at one of the ends of the polymer, but are randomly distributed along the polymer backbone. In this regard, the polymers made in some embodiments of the invention can be characterized by either of the general formulas I or II:

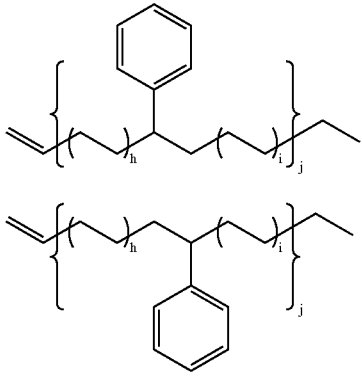

wherein h, i and j are each a number greater than or equal to 1.

Under the polymerization conditions chosen for some embodiments, the degree of polymerization, which corresponds to the formula $((h+i+1)*j)+2$, in a bulk sample is between 5 and 100, based on proton NMR analysis, more specifically between 5 and 50 and even more specifically between 5 and 25. In addition, the number of styrene monomers (j) in a bulk sample is between 1 and 10, more specifically between 1 and 5 and even more specifically between 1 and 3. In alternative embodiments, the number of styrene monomers (j) in a bulk sample is between 2 and 10 and more specifically between 2 and 5. Testing to determine these numbers is typically by proton NMR, but other techniques known to those of skill in the art may also be employed.

The low molecular weight ethylene-styrene copolymers made in some embodiments of the invention differ significantly from any previously reported ethylene-styrene copolymers or co-oligomers. The products have on average one or more styrene units incorporated per chain, such that the incorporated styrene unit is essentially randomly distributed along the length of the chain, such that the typical chain has a methyl (—CH$_3$) group at one end and a vinyl (—CH═CH$_2$) group at the other end. Thus the products are essentially linear α-olefins with phenyl substituents placed essentially randomly along the length of the chain. Suitable metal-ligand complexes, which are useful as catalysts for the production of the styrene-ethylene copolymers discussed above, are those generally having two non-leaving group (or ancillary) phenol-heterocycle or phenol-triazole ligands attached to the metal center. In other words, there is a 2:1 ligand to metal ratio intended (although such ratio may not be exact). Such metal complexes may be characterized by the following general formula:

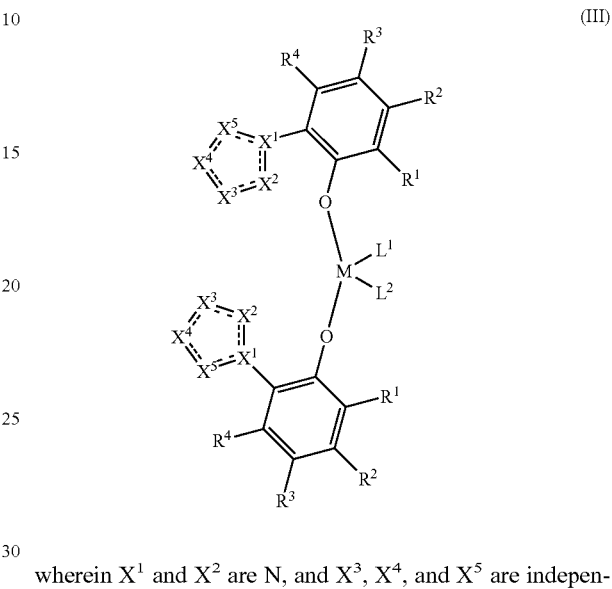

wherein $X^1$ and $X^2$ are N, and $X^3$, $X^4$, and $X^5$ are independently selected from the group consisting of N and $CR^{15}$, where $R^{15}$ is selected from the group consisting of hydrogen, alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, halo, silyl, boryl, phosphino, amino, thio, seleno, and combinations thereof, provided that at least one and not more than two of $X^3$, $X^4$, and $X^5$ are N; optionally, $X^3$ and $X^4$ may be joined to form a fused ring system having up to 50 atoms, not counting hydrogen atoms.

In general, $R^1$, $R^2$, $R^3$ and $R^4$ are independently selected from hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, halo, silyl, boryl, phosphino, amino, thio, seleno, nitro, and combinations thereof, with the exception that $R^1$ may not be hydrogen, and optionally two or more of $R^1$, $R^2$, $R^3$ and $R^4$ (for example $R^1$ and $R^2$, or $R^2$ and $R^3$, or $R^3$ and $R^4$) may be joined to form a fused ring system having up to 50 atoms, not counting hydrogens. In the above formula, however, $R^2$ and $R^4$ are both hydrogen or are joined in a fused ring system, as described;

M is zirconium, titanium or hafnium; and $L^1$ and $L^2$ are independently selected from the group consisting of halide, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, hydroxy, thio, boryl, silyl, amino, hydrido, allyl, seleno, phosphino, carboxylates, and combinations thereof.

It should be understood that the numbers for h, i and j (as described above) are dependant on the polymerization conditions chosen, including the amount of ethylene, amount of styrene, temperature, pressure, catalyst concentration and structure (including the activator(s) or activating package). Thus, both the catalyst ligand structure and choice of metal may influence the ethylene-styrene copolymerization catalyst performance and product properties. Under the specific polymerization conditions set forth in the examples herein, some general trends included: (i) an aryl (for example phenyl, naphthyl or anthracenyl) substituent at the ortho position of the phenol ($R^1$) generally results in higher styrene incorporation into the copolymer product compared to a tert-butyl substituent at the ortho position, (ii) zirconium compositions and complexes have given higher activity, higher styrene incorporation, and lower molecular weight products than analogous hafnium compositions and complexes, (iii) halo, especially chloro, substitution on the aromatic ring results in increased activity compared with H at these positions, (iv) methoxy (—OMe) substitution at the para position of the phenol ($R^3$) results in higher molecular weight product as compared to a tert-butyl substitution at this position, (v) an aryl (for example phenyl, naphthyl or anthracenyl) substituent at the ortho position of the phenol ($R^1$) results in longer catalyst lifetime at high temperature as compared to a tert-butyl substituent at the ortho position, there are ligand effects, metal effects and activator effects. While these trends were found for the specific polymerization conditions employed herein, some or all of these trends might be modified under different polymerization conditions.

Polymerization Systems

Polymerization can be carried out in the Ziegler-Natta or Kaminsky-Sinn methodology, including temperatures of from −100° C. to 300° C. and pressures from atmospheric to 3000 atmospheres. Suspension, solution, slurry, gas phase or high-pressure polymerization processes may be employed with the catalysts and compounds described herein. Such processes can be run in a batch, semi-batch or continuous mode. Examples of such processes are well known in the art. A support for the catalyst may be employed, which may be inorganic (such as alumina, magnesium chloride or silica) or organic (such as a polymer or cross-linked polymer). Methods for the preparation of supported catalysts are known in the art. Slurry, suspension, solution and high-pressure processes as known to those skilled in the art may also be used with supported catalysts of the invention.

As stated herein, a solution process is specified for certain benefits, with the solution process being run at a temperature above 90° C., more specifically at a temperature above 100° C., further more specifically at a temperature above 110° C. and even further more specifically at a temperature above 130° C. Suitable solvents for polymerization are non-coordinating, inert liquids. Examples include straight and branched-chain hydrocarbons such as isobutane, butane, pentane, isopentane, hexane, isohexane, heptane, octane, Isopar-E® and mixtures thereof; cyclic and alicyclic hydrocarbons such as cyclohexane, cycloheptane, methylcyclohexane, methylcycloheptane, and mixtures thereof; perhalogenated hydrocarbons such as perfluorinated $C_{4-10}$ alkanes, chlorobenzene, and aromatic and alkylsubstituted aromatic compounds such as benzene, toluene, mesitylene, and xylene. Suitable solvents also include liquid olefins which may act as monomers or comonomers including ethylene, propylene, 1-butene, butadiene, cyclopentene, 1-hexene, 1-pentene, 3-methyl-1-pentene, 4-methyl-1-pentene, 1,4-hexadiene, 1-octene, 1-decene, isobutylene, styrene, divinylbenzene, allylbenzene, and vinyltoluene (including all isomers alone or in admixture). Mixtures of the foregoing are also suitable. Other additives that are useful in a polymerization reaction may be employed, such as scavengers, promoters, etc.

In some embodiments, the molecular weight of the copolymers or interpolymers are controlled by the amount of hydrogen present in the polymerization reactor. Therefore, when ultra low molecular weight polymers are desired, an excessive amount of hydrogen is used, especially for the substantially random polymers described herein. In other embodiments, certain catalysts are selected such that only low molecular weight polymers are produced without the need for using hydrogen as a molecular weight regulator. This is the case for the interpolymers with vinyl end groups.

Applications

The low molecular weight polymers disclosed herein have many useful applications and can be used to make a multitude of articles of manufacture. The article of manufacture includes, but is not limited to, waxes, lubricants, additives, etc. The waxes may be used to formulate paints and coatings, printing inks, carbon paper, photo toners, building and construction materials, mold release agents, hot melt adhesives, candles. The waxes may also be used in wood processing, metal working, powder metallurgy and sintering, wax modeling, sizing, crop protection, and so on. Due to the presence of the vinyl end groups, the low molecular weight polymers can be functionalized by reacting the polymers with a reagent which can react with the vinyl group. Thus, various functionalized low molecular weight polymers are obtained.

Waxes

The low molecular weight polymers disclosed herein can be used as a wax or a blend of waxes. The waxes or blends thereof are used to formulate hot melt adhesives, plastic additives, aqueous dispersions, processing aids, lubricants, printing inks, toners, etc. Methods and components for making such products are disclosed, for example, in the following U.S. Pat. Nos. 6,143,846; 5,928,825; 5,530,054; 6,242,148; 6,207,748; 5,998,547; 6,262,153; 5,037,874; 5,482,987; 6,133,490; and 6,080,902; in the following PCT applications: WO 01/44387; WO 01/72855; WO 01/64776; WO 01/56721; WO 01/64799; WO 01/64800; in the following EP patents or patent applications: EP 890619; EP 916700; and EP 0050313; EP 1081195; in the following German patents or patent applications: DE 10063422; DE 10063423; DE 10063424; and DE 10063421; in the following Japanese Patent Application No. 11228911 A2; and in the following Chinese patents or patent applications: CN 1270187; and CN 1270189. The low molecular weight polymers disclosed herein can be used as a wax as taught in the above patents or patent applications with or without modifications.

Additional wax applications are disclosed in the following U.S. Pat. No. 6,060,550 entitled "Polyethylene wax as processing aid for hot-melt adhesive compositions;" U.S. Pat. No. 6,028,138 entitled "Phase change ink formulation using urethane isocyanate-derived resins, a polyethylene wax and toughening agent;" U.S. Pat. No. 5,994,453 entitled "Phase change ink formulation containing a combination of a urethane resin, a mixed urethane/urea resin, a mono-amide and a polyethylene wax;" U.S. Pat. No. 5,037,874 entitled "Hot melt system comprising a polyethylene wax with CO incorporated in the wax;" U.S. Pat. No. 6,331,590 entitled "Polypropylene wax;" U.S. Pat. No. 6,316,650 entitled "Wax preparation comprising partial esters of polyols and montan wax acid and Ca soaps of montan wax acid; U.S. Pat. No. 6,303,665 entitled "Spray-resistant aqueous foam, its production and use;" U.S. Pat. No. 6,262,153 entitled "Colored wax articles;" U.S. Pat. No. 6,251,553 entitled "Use of mixed-crystal pigments of the quinacridone series in electrophotographic toners and developers, powder coatings and inkjet inks;" U.S. Pat. No. 6,117,922 entitled "Solid, storage-stable antistat mixtures and process for their preparation;" U.S. Pat. No. 6,117,606 entitled "Use of pigment yellow 155 in electrophotographic toners and developers, powder coatings and inkjet inks;" U.S. Pat. No. 6,110,238 entitled "Process for improving the cold-flow properties of fuel oils;" U.S. Pat. No. 6,107,530 entitled "Use of polyolefin waxes in solvent pastes;" 6,080,902 entitled "Method of using polyolefin waxes;" U.S. Pat. No. 6,005,042 entitled "Aqueous polymer dispersions as binders for elastic, non-blocking and scratch-resistant coatings;" U.S. Pat. No. 5,998,547 entitled "Polypropylene waxes modified so as to be polar;" U.S. Pat. No. 5,840,416 entitled "Lining material, method for coating a material for producing a lining, and apparatus;" U.S. Pat. No. 5,783,618 entitled "Aqueous wax and silicone dispersions, their production and use;" U.S. Pat. No. 5,494,593 entitled "Amphoteric surfactants-containing wax compositions, their production and their use;" U.S. Pat. No. 4,357,185 entitled "Process for coating crystalline explosives with polyethylene wax." The low molecular weight polymers disclosed herein can be used as a wax as taught in the above patents with or without modifications. For example, the waxes made from the low molecular weight polymers can be used in textile applications in a manner disclosed in the following U.S. patents: U.S. Pat. No. 4,675,022, entitled "Aqueous wax dispersions useful as textile finishing agents;" U.S. Pat. No. 4,329,390, entitled "Cationic surfactant-containing aqueous wax dispersions, and their use as textile finishing agents;" and U.S. Pat. No. 4,165,603, entitled "Apparatus for waxing yarn using solid wax on a textile machine." Such waxes can also be used to form wax dispersions as those disclosed the following U.S. Pat. No. 6,075,090, entitled "Method of preparing an nonaqueous composite wax particle dispersion;" U.S. Pat. No. 6,066,316, entitled "Fine dispersion composition of wax, hair cosmetic preparation and glazing agent;" U.S. Pat. No. 5,798,136, entitled "Simultaneous coatings of wax dispersion containing lubricant layer and transparent magnetic recording layer for photographic element;" U.S. Pat. No. 5,637,147, entitled "Calendar for producing a sheet having wax-containing dispersion thereon." Such waxes may also be used in the manner disclosed in the preceding patents. Some examples of the applications are described as follows.

1) Hot Melt Adhesive

As an example, the low molecular weight polymers disclosed herein can be used as a wax component in a hot melt adhesive. Generally, hot melt adhesives comprise three components: a polymer, a tackifier, and a wax. Each component may comprise a blend of two or more components, that is, the polymer component may comprise a blend of two different polymers. The polymer provides cohesive strength to the adhesive bond. The tackifier provides tack to the adhesive which serves to secure the items to be bonded while the adhesive sets, and reduces the viscosity of the system making the adhesive easier to apply to the substrate. The tackifier may be further used to control the glass transition temperature of the formulation. The wax controls the open/close times and reduces the viscosity of the system. Hot melt adhesives may further typically comprise oil as a filler and/or to reduce the viscosity of the system.

Hot melt adhesives based on previously used polymers include ethylene vinyl acetate copolymers (EVA), atactic polypropylene (APP), amorphous polyolefins, low density polyethylene (LDPE), and homogeneous linear ethylene/alpha-olefin copolymers. Prior art hot melt adhesives typically employed large levels of tackifier to reduce the viscosity of the system to levels which enabled its facile application to the substrate, for instance, to viscosities less than about 5000 centipoise.

Pressure sensitive adhesives are materials which are aggressively and permanently tacky at room temperature at the time of application, and which firmly adhere to a variety of dissimilar surfaces with the application of light pressure, such as pressing with a finger. Despite their aggressive tackiness, pressure sensitive adhesives may be removed from smooth surfaces without leaving significant residue. Pressure sensitive adhesives are widely used in everyday applications, such as masking tape, clear office tape, labels, decals, bandages, decorative and protective sheets (such as shelf and drawer liners), floor tiles, sanitary napkin/incontinence device placement strips, sun control films, and the joining of gaskets to automobile windows.

Historically, pressure sensitive adhesives were based on natural rubber and wood rosins, which were carried by a solvent. Articles bearing such adhesives were manufactured by applying a solution of the adhesive on a suitable backing, and removing the solvent by a devolatilizing process. However, in response to cost increases in solvents and regulatory restrictions regarding emissions, water-based adhesives and solid-form hot melt adhesives (HMA's) have been developed.

Historically, adhesives have been based on one of four types of polymers: elastomers (such as natural rubber, styrene-isoprene-styrene block copolymers, styrene-butadiene-styrene block copolymers, and styrene-butadiene random copolymers); acrylics (such as interpolymers of butyl acrylate, 2-ethyl hexyl acrylate, and methyl methacrylate); hydrocarbons (such as a tactic polypropylene, amorphous polypropylene, poly-1-butene, and low density polyethylene); and ethylene vinyl acetate. More recently, hot melt adhesives based on homogeneous linear and substantially linear ethylene polymers have been disclosed and claimed.

Diene-based elastomers may be utilized in solvent-based, water-born, and hot melt adhesives. However, adhesive systems based on such elastomers are disadvantageous in that the sites of unsaturation in the block copolymer backbone make the hot melt adhesive susceptible to degradation by the action of oxygen and ultraviolet light.

Acrylic systems, while stable to oxygen and ultraviolet light are inferior to diene-based elastomer systems in terms of the balance of tack, peel and creep resistance which is preferred for pressure sensitive adhesive applications. Further, such systems are typically available only in the solvent-based and water-borne systems, making them further disadvantageous for the reasons set forth above.

Hydrocarbon-based systems were developed at least in part to provide improved stability to oxygen and ultraviolet light, as compared to diene-based elastomer systems, as well as the ability to be utilized in hot melt adhesive systems. Hydrocarbon-based systems which comprise, atactic polypropylene, interpolymers of propylene with higher order alpha-olefins, or poly-alpha-olefins, exhibit a poor balance of properties. In particular poly-1-butene has a tendency to slowly crystallize after application to the substrate, leading to a profound loss of tack. When oil is added to increase tack, the oil tends to migrate out of the adhesive into the backing layer or the substrate. Atactic polypropylene and poly-alpha-olefins suffer from low tensile strength, which leads to low cohesive strength on peel and to the leaving of a residue on the substrate surface after peeling. Hydrocarbon-based systems are typically not preferred due to the limited ability of low density polyethylene to accept the formulation ingredients required to produce a hot melt adhesive with suitable mechanical properties.

Ethylene vinyl acetate based systems are limited in that as higher vinyl acetate levels are selected, elastic performance increases, but compatibility with formulation ingredients decreases.

Hot melt adhesives based on homogeneous linear ethylene/alpha-olefin copolymers are disclosed in U.S. Pat. No. 5,530,054.

In some embodiments, ultra-low molecular weight ethylene polymers disclosed herein may be employed as an extending or modifying composition. Ultra-low molecular weight polymers employed will be either ethylene homopolymers or interpolymers of ethylene and a comonomer selected from the group consisting of $C_3$-$C_{20}$ alpha-olefins, styrene, alkyl-substituted styrene, tetrafluoroethylene, vinylbenzocyclobutane, non-conjugated dienes, and cycloalkenes.

The ultra-low molecular weight polymer may have a number average molecular weight less than 8200, preferably less than 6000, and more preferably less than 5000. Such ultra-low molecular weight polymer may typically have a number average molecular weight of at least 800, preferably at least 1300.

Ultra-low molecular weight polymers, in contrast to paraffinic waxes and crystalline ethylene homopolymer or interpolymer waxes, may have a $M_w/M_n$ of from 1.5 to 2.5, preferably from 1.8 to 2.2.

Ultra-low molecular weight ethylene polymers generally lead to a low polymer and formulation viscosity, but are characterized by peak crystallization temperatures which are greater than the peak crystallization temperatures of corresponding higher molecular weight materials of the same density. In adhesive applications, the increase in peak crystallization temperature translates to an increased heat resistance, for instance, an improved creep resistance in pressure sensitive adhesives, and improved shear adhesion failure temperature (SAFT) in hot melt adhesives.

When the ultra-low molecular weight ethylene polymer is an interpolymer of ethylene and at least one vinylidene aromatic comonomer or hindered aliphatic vinylidene comonomer, it may be employed as a tackifier (as described above). Further, as the mole percent of ethylene increases, the crystallinity of the interpolymer will likewise increase. Accordingly, ultra-low molecular weight interpolymers may be useful as waxes to control the open and close time of the adhesive system.

In other embodiments, a traditional wax may be used as an extending or modifying composition. Modification of the adhesive with a paraffinic wax or a crystalline polyethylene wax, will tend to improve the high temperature performance, such as creep resistance and SAFT, and reduce the open and close times of adhesives comprising substantially random interpolymers which have a high styrene content.

2) Toners

Polyethylene and polypropylene waxes made in some embodiments of the invention can be used to make toners for use in image forming devices in accordance with the disclosure of U.S. Pat. No. 6,242,148 and No. 6,194,114. For example, the developing agent according to embodiments of the invention uses a binder resin having a glass transition point between 50 and 65° C. and a 150° C. melt index between 1 and 10 (g/10 min.). The use of a binder resin having these ranges of resin characteristics allows the toner to be efficiently fixed to paper during a fixing step. Such a resin also has the effect of precluding the toner from being solidified during storage in a hot and humid environment.

A suitable resin material includes a copolymer of a styrene and its substitution product or an acrylic-based resin. The copolymer of a styrene and its substitution product includes, for example, a polystyrene homopolymer, a styrene resin with hydrogen addition, styrene-isobutylene copolymer, a styrene-butadiene copolymer, an acrylonitrile-butadiene-styrene three-component copolymer, an acrylonitrile-styrene-acrylic ester three-component copolymer, a styrene-acrylonitrile copolymer, an acrylonitrile-acrylic rubber-styrene three-component copolymer, an acrylonitrile-EVA-styrene three-component copolymer, a styrene-p-chlorostyrene copolymer, a styrene-propylene copolymer, a styrene-butadiene rubber, or a styrene-maleic anhydride.

In addition, the acrylic-based resin includes, for example, a polyacrylate, a polymethylmethacrylate, a polyethylmethacrylate, a poly-n-butylmethacrylate, a polyglycidylmethacrylate, polycondensed fluorine acrylate, a styrene-methacrylate copolymer, a styrene-butylmethacrylate copolymer, or a styrene-acrylic ethyl copolymer. Other suitable binder resins include a polyvinyl chloride, a polyvinyl acetate, a polyethylene, a polypropylene, a polyester, a polyurethane, a polyamide, an epoxy resin, a phenol resin, a urea resin, a polyvinyl butyral, a polyacrylic resin, a rosin, a modified rosin, a terpen resin, an aliphatic or alicylic hydrocarbon resin, an aromatic petroleum resin, a chlorinated paraffin, and a paraffin wax, which are used in a unitary or mixed form.

A suitable charge control agent includes an alloy azo dye, for example, "Bali First Black 3804", "Pontron S-31", "Pontron S-32", "Pontron S-32", "Pontron S-34", "Pontron S-36" (manufactured by Orient Chemical Co., Ltd.), "Aizen Spiron Black TRH", "T-95", "T-77" (manufactured by Hodogaya Chemical Co., Ltd.), an metal complex of an alkyl derivative of salicylate, for example, "Pontron E-82", "Pontron E-84", "Pontron E-85" (manufactured by Orient Chemical Co., Ltd.), and metal-free "TN-105" (manufactured by Hodogaya Co., Ltd.). A suitable coloring agent includes a carbon black or an organic or inorganic pigment or dye. The carbon black includes, but not limited to, a thermal black, an acetylene black, a channel black, a furnace black, a lamp black, or a kitchen black, for example.

Polypropylene and polyethylene are used as a parting agent. The polypropylene wax has a melting point between 135 and 160° C. and is added in 3 to 6 percent by weight. The polyethylene wax can be added at a temperature between 90 and 180° C. and can be present in 1 to 3 percent by weight of the total composition.

An additive that can be added to the toner according to embodiments of the invention includes silica grains, metallic oxide grains, and cleaning auxiliaries. The silica grains include a silicon dioxide, an aluminum silicate, a sodium silicate, a zinc silicate, and a magnesium silicate.

The metallic oxide grains include an zinc oxide, a titanium oxide, an aluminum oxide, an zirconium oxide, a strontium titanate, and a barium titanate. The cleaning auxiliaries include resin powders such as a polymethylmethacrylate, a polyvinylidene fluoride, and a polytetrafluoroethylene. These external additives may be subjected to surface treatment such as hydrophobicity treatment.

A method for manufacturing the toner according to embodiments of the invention is described below. First, the binder resin, the coloring agent, the waxes, the charge control agent, and other components as required are dispersed and mixed together using a ball mill, a V-blender, a Nauta mixer, or a Henshel mixer. Next, the mixture obtained is melted and kneaded under heat using a pressure kneader, a roll, a screw extruder, or a banbury mixer. Subsequently, the kneaded mixture is coarsely crushed using a hammer mill, a crusher mill, or a jet mill. Further, the coarsely crushed mixture is pulverized using the jet mill, and the resulting mixture is then classified into desired particle sizes by means of air separation or the like. Finally, a predetermined additive is added to the mixture and mixed therewith using a high-speed fluidized blender to obtain a desired toner. This high-speed fluidized blender includes, for example, a Henshel mixer, a super mixer, and a microspeed mixer.

3) Investment Casting

The wax composition in accordance with embodiments of the invention can be used in investment casting, also known as precision casting. Investment casting involves introducing molten metal into molds made from refractory materials, such as ceramics. Slurries containing refractory material and other materials, such as binders, dispersing aids, etc., are formed. A pattern formed from a wax composition is immersed in a first slurry, which deposits refractory material on the pattern's surface. Stucco material is applied to the refractory material. The first such layer applied to the pattern is referred to as the facecoat, and contacts the metal during the casting process. Plural additional layers are then applied to the pattern to form the mold. The pattern is removed from inside the mold by heating the mold/pattern composite. Removing the pattern forms an internal void in the mold having the shape of the desired article. Molten metal is poured into the void and allowed to solidify. The mold is then removed from about the article.

Pattern wax compositions used in conventional casting processes typically include significant amounts of filler materials, such as at least 30 percent filler. Examples of conventional fillers include urea and water. Fillers are added to the wax compositions for a number of reasons, including to reduce the amount of wax used, and to change certain physical properties of the wax composition, such as shrinkage.

Pattern wax and wax fillers generally are partially or totally removed from the mold prior to pouring metal. Wax and wax fillers typically are removed from the mold by first autoclaving the mold/pattern composite, followed by firing under oxygen-rich environments to remove any remaining residues. Certain known fillers, such as acrylates, are difficult to burn completely. Additional information concerning investment casting is disclosed in the following U.S. patents: U.S. Pat. No. 5,651,932, entitled "Method for investment wax casting of golf club heads;" U.S. Pat. No. 5,518,537 entitled "Filler and wax composition for investment casting;" U.S. Pat. No. 5,372,177 entitled "Method and apparatus for removing wax from casting mold;" U.S. Pat. No. 5,006,583 entitled "Filler and wax composition for investment casting;" U.S. Pat. No. 4,978,452 entitled "Method for producing wax impregnated filters for investment casting applications;" U.S. Pat. No. 4,934,921 entitled "Investment casting wax injection machine;" U.S. Pat. No. 4,144,075 entitled "Wax composition for investment casting and casting method". The wax composition disclosed herein can be used in a manner taught in the preceding patents.

In addition to investment casting, the wax composition in accordance with embodiments of the invention can be used as a binder for metal and ceramic powder for powder injection molding. Such processes are disclosed in the following U.S. patents: U.S. Pat. No. 6,051,184, entitled "Metal powder injection moldable composition, and injection molding and sintering method using such composition;" U.S. Pat. No. 5,950,063, entitled "Method of powder injection molding;" U.S. Pat. No. 5,427,734, entitled "Process for preparing R—Fe—B type sintered magnets employing the injection molding method;" U.S. Pat. No. 5,421,853, entitled "High performance binder/molder compounds for making precision metal part by powder injection molding;" U.S. Pat. No. 5,417,756, entitled "Process and molding compound for producing inorganic sintered products by injection molding;" U.S. Pat. No. 5,095,048 Method of manufacturing a composition for use in injection molding powder metallurgy;" U.S. Pat. No. 5,080,714, entitled "Compound for an injection molding".

Lubricants or Oil Additives

The low molecular weight polymers disclosed herein may also be used to make lubricants or be used as oil additives. Both copolymers and terpolymers can be used. An example of copolymer is ethylene-styrene copolymer or interpolymer; an example of terpolymer is ethylene-propylene-styrene terpolymer. The polymers disclosed herein can be used to replace one of more components of the lubricants or oil compositions disclosed in the following U.S. patents: U.S. Pat. No. 6,310,164 entitled "Unsaturated copolymers, processes for preparing the same, and compositions containing the same;" U.S. Pat. No. 6,110,880 entitled "Polyolefin block copolymer viscosity modifier;" U.S. Pat. No. 6,100,224 entitled "Copolymers of ethylene alpha-olefin macromers and dicarboxylic monomers and derivatives thereof, useful as additives in lubricating oils and in fuels;" U.S. Pat. No. 6,084,046 entitled "Copolymer and copolymer composition;" U.S. Pat. No. 6,030,930 entitled "Polymers derived from ethylene and 1-butene for use in the preparation of lubricant disperant additives;" U.S. Pat. No. 6,017,859 entitled "Polymers derived from olefins useful as lubricant and fuel oil additives, processes for preparation of such polymers and additives and use thereof;" U.S. Pat. No. 5,912,212 entitled "Lubricating oil composition;" U.S. Pat. No. 5,811,379 entitled "Polymers derived from olefins useful as lubricant and fuel oil additives, processes for preparation of such polymers and additives and use thereof (PT-1267);" U.S. Pat. No. 5,759,967 entitled "Ethylene alpha-olefin/diene interpolymer-substituted carboxylic acid dispersant additives;" U.S. Pat. No. 5,747,596 entitled "Gel-free alpha-olefin dispersant additives useful in oleaginous compositions;" U.S. Pat. No. 5,717,039 entitled "Functionalization of polymers based on Koch chemistry and derivatives thereof;" U.S. Pat. No. 5,663,129 entitled "Gel-free ethylene interpolymer dispersant additives useful in oleaginous compositions;" U.S. Pat. No. 5,658,865 entitled "Oxidation-inhibitive lubricating oil composition;" U.S. Pat. No. 5,366,647 entitled "Derivatized ethylene alpha-olefin polymer useful as multifunctional viscosity index improver additive for oleaginous composition (PT-796);" U.S. Pat. No. 5,294,234 entitled "Fuel compositions of novel ethylene alpha-olefin polymers substituted amine dispersant additives;" U.S. Pat. No. 5,277,833 entitled "Ethylene alpha-olefin polymer substituted mono- and dicarboxylic acid lubricant dispersant additives;" U.S. Pat. No. 5,275,747 entitled "Derivatized ethylene alpha-olefin polymer useful as multifunctional viscosity index improver additive for oleaginous composition;" U.S. Pat. No. 5,229,022 entitled "Ethylene alpha-olefin polymer substituted mono- and dicarboxylic acid dispersant additives (PT-920);" and U.S.

Pat. No. 5,017,299 entitled "Novel ethylene alpha-olefin copolymer substituted Mannich base lubricant dispersant additives".

Lubricating Oils

A variety of lubricant compositions or lubricating oils can be formulated using the low molecular weight polymers disclosed herein. For example, a lubricating oil composition can comprise the alpha-olefin/aromatic vinyl monomer random copolymer disclosed herein and a lubricating oil additive. When the alpha-olefin/aromatic vinyl monomer random copolymer is used as a lubricating base oil and blended with at least one additive, such as an extreme pressure agent, an abrasion resistance agent, an oiliness improver and a detergent-dispersant, a lubricating oil composition having excellent properties can be obtained.

In addition, another lubricating oil composition can comprise: (1) a base oil comprising a mineral oil and/or a hydrocarbon synthetic oil, and (2) an alpha-olefin/aromatic vinyl monomer random copolymer which comprises 40 to 75 percent by mol of constituent units derived from ethylene, 0 to 45 percent by mol of constituent units derived from an alpha-olefin of 3 to 20 carbon atoms and 1 to 40 percent by mol of constituent units derived from an aromatic vinyl monomer, with the proviso that the total amount of the constituent units derived from ethylene and the constituent units derived from the alpha-olefin is 60 to 99 percent by mol, and has an intrinsic viscosity [η], as measured in decalin at 135° C., of 0.1 to 5.0 dl/g.

Still another lubricating oil composition comprises: (1) a base oil comprising a mineral oil and/or a hydrocarbon synthetic oil, (2) a low-molecular weight alpha-olefin/aromatic vinyl monomer random copolymer which comprises 40 to 75 percent by mol of constituent units derived from ethylene, 0 to 45 percent by mol of constituent units derived from an alpha-olefin of 3 to 20 carbon atoms and 1 to 40 percent by mol of constituent units derived from an aromatic vinyl monomer, with the proviso that the total amount of the constituent units derived from ethylene and the constituent units derived from the alpha-olefin is 60 to 99 percent by mol, and has an intrinsic viscosity [η], as measured in decalin at 135° C., of 0.01 to 0.30 dl/g, and (3) a lubricating oil additive.

A viscosity index improver can be formulated according to embodiments of the invention. It comprises the same alpha-olefin/aromatic vinyl monomer random copolymer as the specific alpha-olefin/aromatic vinyl monomer random copolymer employable in the second lubricating oil composition. Similarly, a lubricating oil compatibility improver can be formulated according to embodiments of the invention. It comprises the same low-molecular weight alpha-olefin/aromatic vinyl monomer random copolymer as the specific low-molecular weight alpha-olefin/aromatic vinyl monomer random copolymer employable in the third lubricating oil composition.

A fuel oil composition can also be prepared according to embodiments of the invention comprises: (1) a middle fraction fuel oil having a boiling point of 150 to 400° C., and (2) an alpha-olefin/aromatic vinyl type fuel oil fluidity improver comprising an alpha-olefin/aromatic vinyl monomer random copolymer which comprises 60 to 90 percent by mol of constituent units derived from ethylene, 0 to 39 percent by mol of constituent units derived from an alpha-olefin of 3 to 20 carbon atoms and 1 to 40 percent by mol of constituent units derived from an aromatic vinyl monomer, with the proviso that the total amount of the constituent units derived from ethylene and the constituent units derived from the alpha-olefin is 60 to 99 percent by mol, and has an intrinsic viscosity [η], as measured in decalin at 135° C., of 0.01 to 1.0 dl/g.

A. Lubricating Oil Additive

The lubricating oil additive for use in embodiments of the invention is at least one additive selected from an extreme pressure agent, an abrasion resistance agent, an oiliness improver and a detergent-dispersant.

Examples of the extreme pressure agents include sulfur type extreme pressure agents, such as sulfides, sulfoxides, sulfones, thiophosphinates, thiocarbonates, fats and oils, sulfurized fats and oils, and olefin sulfides; phosphoric acids, such as phosphoric esters, phosphorous esters, phosphoric ester amines and phosphorous ester amines; and halogen compounds, such as chlorinated hydrocarbons.

Examples of the abrasion resistance agent include inorganic or organic molybdenum compounds, such as molybdenum disulfide; organoboron compounds, such as alkylmercaptyl borate; graphite; antimony sulfide; boron compounds; and polytetrafluoroethylene.

Examples of the oiliness improvers include higher fatty acids, such as oleic acid and stearic acid; higher alcohols, such as oleyl alcohol; amines; esters; sulfurized fats and oils; and chlorinated fats and oils.

Examples of the detergent-dispersants include metallic sulfonates, such as calcium sulfonate, magnesium sulfonate and barium sulfonate; thiophosphonates; phenates; salicylates; succinimides; benzylamine; and succinates.

The lubricating oil composition may further contain a viscosity index improver, an antioxidant, an anti-corrosion agent and an anti-foaming agent.

As the viscosity index improvers, those generally added to lubricating oils are available, and examples thereof include natural resins, such as mineral oil, and synthetic resins, such as ethylene/alpha-olefin copolymer, alpha-olefin homopolymer, styrene/butadiene copolymer, poly(meth) acrylate and naphthalene condensate.

Examples of the antioxidants include amine compounds, such as 2,6-di-t-butyl-4-methylphenol; and sulfur or phosphorus compounds, such as zinc dithiophosphate.

Examples of the anti-corrosion agents include carboxylic acids and their salts, such as oxalic acid; sulfonates; esters; alcohols; phosphoric acid and its salts; benzotriazole and its derivatives; and thiazole compounds.

Examples of the anti-foaming agents include silicone compounds, such as dimethylsiloxane and silica gel dispersion; alcohol compounds; and ester compounds.

Though the amount of the lubricating oil additive used varies depending on the lubricating properties requested, it is in the range of usually 0.01 to 80 parts by weight, preferably 0.05 to 60 parts by weight, based on 100 parts by weight of the alpha-olefin/aromatic vinyl compound random copolymer.

The lubricating oil composition may further contain a mineral oil or a hydrocarbon synthetic oil in an amount of up to 50 percent by weight.

Since the lubricating oil composition contains the alpha-olefin/aromatic vinyl compound random copolymer as a base oil, the composition is excellent in compatibility with additives as well as in viscosity properties, heat stability, oxidation stability and abrasion resistance.

B. Base Oil

The base oil used in the second lubricating oil composition is a lubricating base oil comprising a mineral oil and/or a hydrocarbon synthetic oil. These oils can be used alone or as a mixture of two or more kinds without specific limitation, as long as they have a viscosity at 100° C. of 1.5 to 40.0 mm$^2$/S, preferably 2.0 to 10.0 mm$^2$/S. The mineral oil has a viscosity in the above range.

The mineral oil is, for example, a refined oil obtained by subjecting a paraffin base crude oil or an intermediate base crude oil to atmospheric distillation or subjecting a residual oil of the atmospheric distillation to vacuum distillation and then refining the resulting distillate oil in a conventional manner, or a deep-dewaxed oil obtained by deep-dewaxing the refined oil obtained above. Examples of the refining methods include hydrogenation, dewaxing, solvent extraction, alkali distillation, sulfuric acid washing and clay treatment. These methods can be carried out singly or in appropriate combination, or the same method can be repeated plural times. In these cases, there is no specific limitation on the order of the methods and the number of repetition times. In the present invention, it is particularly preferable to use a mineral oil obtained by a solvent dewaxing process that is made under severe conditions or obtained by a deep-dewaxing process such as a catalytic hydrogenation dewaxing process using a zeolite catalyst.

Examples of the hydrocarbon synthetic oils preferably used include oligomers obtained by polymerizing or copolymerizing olefins of 2 to 20 carbon atoms or arbitrary mixtures of these olefins, such as an oligomer of 1-octene, an oligomer of 1-decene and an oligomer of 1-dodecene. In addition to the mineral oil and/or the hydrocarbon synthetic oil, also available are diesters, such as di-2-ethylhexyl sebacate, dioctyl adipate and dioctyl dodecanoate, and polyol esters, such as pentaerythritol tetraoleate and trimethylolpropane tripelargonate. The oligomers are obtained by (co)polymerizing olefins of 2 to 20 carbon atoms by any processes. In the second lubricating oil composition, the base oil is used in an amount of 50.0 to 99.8 percent by weight, preferably 60.0 to 95.0 percent by weight.

C. Other Additives

Additive concentrates and lubricating oil compositions disclosed herein may contain other additives. The use of such additives is optional and the presence thereof in the compositions will depend on the particular use and level of performance required. Thus the other additive may be included or excluded. Additive concentrates typically comprise from 0.1 percent to 30 percent by weight of interpolymer and from 70 percent to 99.9 percent by weight of a substantially, inert, normally liquid, organic diluent.

Lubricating oil compositions often comprise zinc salts of a dithiophosphoric 15 acid, often referred to as zinc dithiophosphates, zinc 0,0-dihydrocarbyl dithiophosphates, and other commonly used names. They are sometimes referred to by the abbreviation 2DP. One or more zinc salts of dithiophosphoric acids may be present in a minor amount to provide additional extreme pressure, anti-wear and anti-oxidancy performance.

Other additives that may optionally be used in the lubricating oils of this invention include, for example, detergents, dispersants, supplemental viscosity improvers, oxidation inhibiting agents, corrosion inhibiting agents, pour point depressing agents, extreme pressure agents, anti-wear agents, color stabilizers, friction modifiers, and anti-foam agents.

Extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, molybdenum compounds, and the like.

Other oxidation inhibiting agents include materials such as alkylated diphenyl amines, hindered phenols, especially those having tertiary alkyl groups such as tertiary butyl groups in the position ortho to the phenolic —OH group, and others. Such materials are well known to those of skill in the art.

Auxiliary viscosity improvers (also sometimes referred to as viscosity index improvers or viscosity modifiers) may be included in the compositions of this invention. Viscosity improvers are usually polymers, including polyisobutenes, polymethacrylic acid esters, hydrogenated diene polymers, polyalkyl styrenes, esterified styrene-maleic anhydride copolymers, hydrogenated alkenylarene-conjugated diene copolymers and polyolefins.

Multifunctional viscosity improvers, which also have dispersant and/or antioxidancy properties are known and may optionally be used in addition to the products of this invention. Pour point depressants may be included in the additive concentrates and lubricating oils described herein. Those which may be used are described in the literature and are well-known to those skilled in the art; see for example, page 8 of "Lubricant Additives" by C. V. Smalheer and R. Kennedy Smith (Lezius-Riles Company Publisher, Cleveland, Ohio, 1967). Pour point depressants useful for the purpose of this invention, techniques for their preparation and their use are described in U.S. Pat. Nos. 2,387,501; 2,015,748; 2,655,479; 1,815,022; 2,191,498; 30 2,666,748; 2,721,877; 2,721,878; 3,250,715; and 5,707,943.

Anti-foam agents used to reduce or prevent the formation of stable foam include silicones or organic polymers. Examples of these and additional anti-foam compositions are described in "Foam Control Agents", by Henry T. Kemer (Noyes Data Corporation, 1976), pages 125-162. Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by a least one direct carbon-to-phosphorus linkage.

The term "basic salt" is used to designate metal salts wherein the metal is present in stoichiometrically larger amounts than the organic acid radical. The relative amount of metal present in "basic salts" is frequently indicated by the expression "metal ratio" (abbreviated MR), which is defined as the number of equivalents of metal present compared to a "normal", stoichiometric amount. Thus, for example, a basic salt containing twice the amount of metal compared to the stoichiometric amount, has a metal ratio (MR) of 2.

Ashless detergents and dispersants are so-called despite the fact that, depending on its constitution, the detergent or dispersant may upon combustion yield a nonvolatile residue such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent number 1,306,529 and in many U.S. patents including the following: U.S. Pat. Nos. 3,163,603; 3,399,141; 3,574,101; 3,184,474; 3,415,750; 3,576,743; 3,215,707; 3,433,744; 3,630,904; 3,219,666;

3,444,170; 3,632,510; 3,271,310; 3,448,048; 3,632,511; 3,272,746; 3,448,049; 3,697,428; 3,281,357; 3,451,933; 3,725,441; 3,306,908; 3,454,607; 4,194,886; 3,311,558; 3,467,668; 4,234,435; 3,316,177; 3,501,405; 4,491,527; 3,340,281; 3,522,179; 5,696,060; 3,341,542; 3,541,012; 5,696,067; 3,346,493; 3,541,678; 5,779,742; 3,351,552; 3,542,680; RE 26,433; 3,381,022; and 3,567,637.

(2) Reaction products of relatively high molecular weight aliphatic or alicyclic halides with amines, preferably polyalkylene polyamines. These may be characterized as "amine dispersants" and examples thereof are described for example, in the following U.S. patents: U.S. Pat. Nos. 3,275,554; 3,454,555; 3,438,757; and 3,565,804.

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. patents are illustrative: U.S. Pat. Nos. 3,413,347; 3,725,480; 3,697,574; 3,726,882; and 3,725,277.

(4) Products obtained by post-treating the carboxylic amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents: U.S. Pat. Nos. 3,036,003; 3,282,955; 3,493,520; 3,639,242; 3,087,936; 3,312,619; 3,502,677; 3,649,229; 3,200,107; 3,366,569; 3,513,093; 3,649,659; 3,216,936; 3,367,943; 3,533,945; 3,658,836; 3,254,025; 3,373,111; 3,539,633; 3,697,574; 3,256,185; 3,403,102; 3,573,010; 3,702,757; 3,278,550; 3,442,808; 3,579,450; 3,703,536; 3,280,234; 3,455,831; 3,591,598; 3,704,308; 3,281,428; 3,455,832; 3,600,372; 3,708,522; and 4,234,435.

(5) Polymers and copolymers of oil-solubilizing monomers such as decyl methacrylate, vinyl decyl ether and high molecular weight olefins with monomers containing polar substituents, for example, aminoalkyl acrylates or methacrylates, acrylamides and poly-(oxyethylene)-substituted acrylates. These may be characterized as "polymeric dispersants" and examples thereof are disclosed in the following U.S. patents: U.S. Pat. Nos. 3,329,658; 3,666, 730; 3,449,250; 3,687,849; 3,519,565; and 3,702,300.

The above-illustrated other additives may each be present in lubricating compositions at a concentration of as little as 0.001 percent by weight, usually ranging from 0.01 percent to 20 percent by weight. In most instances, they each contribute from 0.1 percent to 10 percent by weight, more often up to about 5 percent by weight.

D. Additive Concentrates

The various additive-compositions of this invention described herein can be added directly to the oil of lubricating viscosity. Preferably, however, they are diluted with a substantially inert, normally liquid organic diluent such as mineral oil, a synthetic oil such as a polyalphaolefin, naphtha, benzene, toluene or xylene, to form an additive concentrate. These concentrates usually comprise 0.1 to 30 percent by weight, frequently from 1 percent to 20 percent by weight, more often from 5 percent to 15 percent by weight, of the interpolymers of this invention and may contain, in addition, one or more other additives known in the art or described hereinabove. Additive concentrates are prepared by mixing together the desired components, often at elevated temperatures, usually less than 150° C., often no more than about 130° C., frequently no more than about 115° C.

E. Oil of Lubricating Viscosity

The lubricating compositions of this invention employ an oil of lubricating viscosity, including natural or synthetic lubricating oils and mixtures thereof. Mixture of mineral oil and synthetic oils, particularly polyalphaolefin oils and polyester oils, are often used. Natural oils include animal oils and vegetable oils (for example castor oil, lard oil and other vegetable acid esters) as well as mineral lubricating oils such as liquid petroleum oils and solvent-treated or acid treated mineral lubricating oils of the paraffinic, naphthenic or mixed paraffinic-naphthenic types. Hydrotreated or hydrocracked oils are included within the scope of useful oils of lubricating viscosity.

Oils of lubricating viscosity derived from coal or shale are also useful. Synthetic lubricating oils include hydrocarbon oils and halosubstituted hydrocarbon oils such as polymerized and interpolymerized olefins. etc. and mixtures thereof, alkylbenzenes, polyphenyl. (for example, biphenyls, terphenyls, alkylated polyphenyls, etc.), alkylated diphenyl ethers and alkylated diphenyl sulfides and their derivatives, analogs and homologues thereof and the like.

Alkylene oxide polymers and interpolymers and derivatives thereof, and those where terminal hydroxyl groups have been modified by esterification, esterification, etc., constitute other classes of known synthetic lubricating oils that can be used.

Another suitable class of synthetic lubricating oils that can be used comprises the esters of dicarboxylic acids and those made from $C_5$ to $C_{12}$ monocarboxylic acids and polyol s or polyether polyols.

Other synthetic lubricating oils include liquid esters of phosphorus-containing acids, polymeric tetrahydrofurans, alkylated diphenyloxides and the like.

Unrefined, refined and re-refined oils, either natural or synthetic (as well as mixtures of two or more of any of these) of the type disclosed herein above can used in the compositions of the present invention. Unrefined oils are those obtained directly from a natural or synthetic source without further purification treatment. Refined oils are similar to the unrefined oils except they have been further treated in one or more purification steps to improve one or more properties. Re-refined oils are obtained by processes similar to those used to obtain refined oils applied to refined oils which have been already used in service. Such re-refined oils often are additionally processed by techniques directed to removal of spent additives and oil breakdown products.

Specific examples of the above-described oils of lubricating viscosity are given in Chamberlin III, U.S. Pat. No. 4,326,972 and European Patent Publication 107,282. A basic, brief description of lubricant base oils appears in an article by D. V. Brock, "Lubrication Engineering", Volume 43, pages 184-5, March, 1987.

Functionalization

The low molecular weight polymers disclosed herein may be modified by typical grafting, hydrogenation, functionalizing, or other reactions well known to those skilled in the art. The polymers may be readily sulfonated or chlorinated to provide functionalized derivatives according to established techniques.

The low molecular weight polymers disclosed herein may also be modified by various chain extending or cross-linking processes including, but not limited to peroxide-, silane-, sulfur-, radiation-, or azide-based cure systems. A full description of the various cross-linking technologies is described in U.S. Pat. No. 5,869,591 and No. 5,977,271.

Dual cure systems, which use a combination of heat, moisture cure, and radiation steps, may be effectively employed. Dual cure systems are disclosed in U.S. Pat. No. 5,911,940 and No. 6,124,370. For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc.

The low molecular weight polymers disclosed herein may also be modified by various other cross-linking processes including, but not limited to the incorporation of a diene component as a termonomer in its preparation and subsequent cross linking by the aforementioned methods and further methods including vulcanization via the vinyl group using sulfur for example as the cross linking agent.

The functionalization can occur at the terminal unsaturated group (for example, vinyl group) or at the aromatic unsaturation. Functionalization includes, but is not limited to, hydrogenation, halogenation (such as chlorination), ozonation, hydroxylation, sulfonation, carboxylation, epoxidation, grafting, etc. Any functional groups, such as maleic anhyride, halogen, amine, amide, ester, carboxylic acid, ether, silane, siloxane, and so on, can be attached to the low molecular weight polymers via known or unknown chemistry. For example, the low molecular weight polymers disclosed herein can be functionalized by the methods disclosed in the following U.S. patents or U.S. statutory invention registration: U.S. Pat. No. 5,849,828 entitled "Metalation and functionalization of polymers and copolymers;" U.S. Pat. No. 5,814,708 entitled "Process for oxidative functionalization of polymers containing alkylstyrene;" U.S. Pat. No. 5,717,039 entitled "Functionalization of polymers based on Koch chemistry and derivatives thereof;" H1,064 entitled "Melt functionalization of polymers."

In some embodiments, functionalized products can be made using a phenol or substituted phenol, maleic anhydride, an epoxidizing agent, a hydrosilylating agent or carbon monoxide and hydrogen, and the like. The low molecular weight polymers disclosed herein may be chlorinated with any of a variety of reagents including elemental chlorine and the chlorinated product then reacted with any of a variety of amines, for example ethylene diamine, to obtain aminated product useful in fuel and motor oil compositions. See, for example, U.S. Pat. Nos. 3,960,515; 4,832,702; 4,234,235; and WO 92/14806. Sulfonation can be conducted according to the methods disclosed in the following U.S. patents: U.S. Pat. No. 5,753,774 entitled "Functional group terminated polymers containing sulfonate group via sulfonation of ethylenically unsaturated polymers;" U.S. Pat. No. 5,723,550 entitled "Bulk sulfonation of EPDM rubber;" U.S. Pat. No. 5,596,128 entitled "Sulfonating agent and sulfonation process;" U.S. Pat. No. 5,030,399 entitled "Method of in-mold sulfonation of molded plastic article;" U.S. Pat. No. 4,532,302 entitled "Process for the sulfonation of an elastomeric polymer;" U.S. Pat. No. 4,308,215 entitled "Sulfonation process;" U.S. Pat. No. 4,184,988 entitled "Process for the sulfonation of an elastomeric polymer;" U.S. Pat. No. 4,157,432 entitled "Bulk sulfonation process;" U.S. Pat. No. 4,148,821 entitled "Process for sulfonation."

In accordance with some embodiments of this invention, the low molecular weight polymers with unsaturation (hereinafter "the unsaturated alpha-olefin polymer") is functionalized, for example, with carboxylic acid producing moieties (preferably acid or anhydride moieties) selectively at sites of carbon-to-carbon unsaturation on the polymer chains, either before or after or while simultaneously reacting the polymer with monounsaturated carboxylic reactant, for example, maleic anhydride, preferably in the presence of a free-radical initiator, to randomly attach carboxylic acid producing moieties, that is, acid or anhydride or acid ester moieties, onto the polymer chains.

The unsaturated alpha-olefin polymer may be functionalized, for example, with carboxylic acid producing moieties (preferably acid or anhydride) by reacting the polymer under conditions that result in the addition of functional moieties, that is, acid, anhydride, ester moieties, etc., onto the polymer chains primarily, and preferably only, at sites of carbon-to-carbon unsaturation (also referred to as ethylenic or olefinic unsaturation).

In one embodiment, this selective functionalization can be accomplished by halogenating for example, chlorinating or brominating the unsaturated alpha-olefin polymer to 1 to 8 wt. percent, preferably 3 to 7 wt. percent chlorine, or bromine, based on the weight of polymer, by passing the chlorine or bromine through the polymer at a temperature of 60° to 250° C., preferably 110° to 160° C., for example, 120° to 140° C., for 0.5 to 10, preferably 1 to 7 hours. The halogenated polymer is then reacted with sufficient monounsaturated reactant capable of adding functional moieties the polymer, for example, monounsaturated carboxylic reactant, at 100 to 250° C., usually 180° C. to 235° C., for 0.5 to 10, for example, 3 to 8 hours, such that the product obtained will contain the desired number of moles of the monounsaturated carboxylic reactant per mole of the halogenated polymer. Processes of this general type are taught in U.S. Pat. Nos. 3,087,436; 3,172,892; 3,272,746 and others. Alternatively, the polymer and the monounsaturated carboxylic reactant are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

The preferred monounsaturated reactants that are used to functionalize the unsaturated alpha-olefin polymer comprise mono- and dicarboxylic acid material, that is, acid, anhydride or acid ester material, including (i) monounsaturated $C_4$ to $C_{10}$ dicarboxylic acid wherein (a) the carboxyl groups are vicinal, (that is, located on adjacent carbon atoms) and (b) at least one, preferably both, of said adjacent carbon atoms are part of said mono unsaturation; or (ii) derivatives of (i) such as anhydrides or $C_1$ to $C_5$ alcohol derived mono- or diesters of (i). Upon reaction with the polymer, the monounsaturation of the monounsaturated carboxylic reactant becomes saturated. Thus, for example, maleic anhydride becomes polymer substituted succinic anhydride, and acrylic acid becomes polymer substituted propionic acid. Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (for example, $C_1$ to $C_4$ alkyl) acid esters of the foregoing, for example, methyl maleate, ethyl fumarate, methyl fumarate, etc.

The monounsaturated carboxylic reactant, preferably maleic anhydride, typically will be used in an amount ranging from about 0.01 percent to about 10 percent, preferably 0.1 to 2.0 percent, based on the weight of the polymer.

While chlorination normally helps increase the reactivity of starting alpha-olefin polymers with monounsaturated functionalizing reactant, it is not necessary with the unsaturated polymers contemplated for use in embodiments of the invention, particularly those preferred polymers which possess a high terminal bond content and reactivity. Preferably, the unsaturated polymer and the monounsaturated functionality reactant, for example, carboxylic reactant, are contacted at elevated temperature to cause an initial thermal "ene" reaction to take place, thereafter the partially "ene" reacted polymer is reacted further in the presence of a free-radical initiator.

Thermal "ene" reactions have been heretofore described in U.S. Pat. Nos. 3,361,673 and 3,401,118.

In an alternative embodiment, the unsaturated alpha-olefin polymer may be functionalized, selectively at the sites of olefinically unsaturated bonds in the polymer chains, with carboxylic acid, carboxylic ester or thiol ester functional groups via a Koch reaction. In accordance with embodiments of the invention, a Koch process comprises contacting a polymer composition comprising at least one polymer having at least one carbon-carbon double bond, with a Koch catalyst. The catalyst is preferably a classical Broensted acid or Lewis acid catalyst. These catalysts which are useful for Koch reactions, are distinguishable from transition metal catalysts of the type useful in hydroformylation reactions above. The Koch reaction is conducted in a manner and under conditions sufficient to form a carbenium ion at the site of said carbon-carbon double bond. The carbenium ion is reacted with carbon monoxide to form an acylium cation, which in turn is reacted with at least one nucleophilic trapping agent selected from the group consisting of water or at least one hydroxyl or one thiol group containing compound. The Koch reaction as applied to polymer in accordance with the present invention has resulted in yields of Koch functionalized polymer of at least 40, preferably at least 50, more preferably at least 80, yet more preferably at least 90 and most preferably at least 95 mole percent of the polymer reacting to form acylium cations which form functional groups, for example carbonyl functional groups.

The Koch reaction mechanism permits controlled functionalization of unsaturated polymers. When carbon of the carbon-carbon double bond is substitued with hydrogen, it will result in an "iso" functional group or when a carbon of the double bond can be fully substituted with hydrocarbyl groups, it will result in an "neo" functional group.

In the Koch process, a polymer having at least one olefinic unsaturation reacted via a Koch mechanism to form the carbonyl or thiol carbonyl group-containing compounds as well as derivatives thereof. The polymers react with carbon monoxide in the presence of an acid catalyst or a catalyst complexed with a neclephilic trapping agent. A preferred catalyst is $BF_3$ and preferred catalyst complexes include $BF_3H_2O$ and $BF_3$ complexed with 2,4-dichlorophenol. The starting polymer reacts with carbon monoxide to form a carbenium ion which in turn reacts with the nucleophilic trapping agent, for example water, alcohol (preferably a substituted phenol) or thiol to form respectively a carboxylic acid, carboxylic ester group, or thiol ester.

Preferred nucleophilic trapping agents are selected from the group consisting of water, monohydric alcohols, polyhydric alcohols hydroxyl-containing aromatic compounds and hetero substituted phenolic compounds. The catalyst and nucleophilic trapping agent can be combined to form a catalytic complex.

The acid catalyst is preferably selected from the group consisting of HF, $BF_3$, $BF_3$ and $H_2SO_4$. The catalytic complex can be selected from the group consisting of $BF_3 \cdot xH_2O$, $BF_3 \cdot (2,4\text{-dichlorophenol})$, $BF_3 \cdot xH_2O \cdot \text{yn-heptanoic acid}$, $BF_3 \cdot \text{yn-heptanoic acid}$, $BF_3 \cdot xH_2O \cdot zH_3PO_4$, and $BF_3 \cdot wCH_3SO_3H$, wherein x is from 0.5 to 1.5; y is from 0.5 to 2.0, z is from 0.5 to 1.5 and w is from 0.5 to 5.0. The acid catalyst or catalyst complexes preferably have a Hammet acidity value of from −8.0 to −11.5 and preferably from −10.0 to −11.5.

Processes for functionalizing unsaturated polymers via a Koch reaction are described more fully in U.S. Pat. No. 5,629,434, entitled "Functionalization of polymers based on Koch chemistry and derivatives thereof."

In still other preferred embodiments, the unsaturated alpha-olefin polymers may be functionalized with carboxylic acid or ester moieties by reacting the starting polymers with carbon monoxide and an alcohol in the presence of a protonic acid and catalyst system comprising (a) at least one of the metals palladium, rhodium, ruthenium, iridium and cobalt in elemental or compound form and (b) a copper compound. Processes of this type are disclosed, for example, in published EP Application 148,592.

In preferred embodiments of this invention, the functionalized olefin polymers are characterized by a high degree of monofunctionality, that is, at least about 65 and preferably at least about 75 percent of the polymer chains contain only one functional group (for example, acid or anhydride group) at a point in the respective polymer chains where a carbon-carbon unsaturated bond was located prior to being functionalized.

Some functional groups may be added directly to the interpolymer by, for example, a Friedel-Crafts reaction or other electrophilic substitution reaction. Such functional groups include, for example, unsubstituted or substituted alkylcarbonyl, arylcarbonyl, and aralkyl groups; carboxylic acid or sulfonic acid groups or alkyl groups substituted with carboxylic acid or sulfonic acid groups; halogen, and $NO_2$, which can subsequently be transformed to $NH_2$. Preferably such groups include acyl such as substituted or unsubstituted phenylcarbonyl, carboxyalkylcarbonyl, and substituted or unsubstituted carboxybenzyl. Particularly preferred groups include —C(O)Me which can be further functionalized to, for example, —$CO_2$H; —C(O)-$pC_6H_4$-Me which in turn can be further functionalized to, for example, —CH(OH)-$pC_6H_4$-Me; for example, —CH($R^5$)$CH_2CH_2CO_2$H; —CH($R^5$)$CH_2CH_2SO_3$H; and —CH($R^5$)-$pC_6H_4$—$CO_2$H, wherein $R^5$ is independantly selected from hydrogen or an alkyl group; and —C(O)$CH_2CH_2CO_2$H. The functional groups containing acid groups can be converted to ionomeric salts, such as zinc ionomers by neutralization. The electrophilic substitution reactions which have been discovered to be advantageously useful for the substantially random polymers described above may be conducted as described in G. A. Olah, *Friedel-Crafts and Related Reactions*, Vol. II, Part 2, J. Wiley & Sons, N.Y., 1964.

While many of the earlier described substituents may be placed directly on the interpolymer by an electrophilic substitution reaction, other substituents are not amenable to this strategy. For this reason it is often advantageous to first halomethylate the interpolymer and then transform the halomethyl group into other substituents by suitable reactions, such as nucleophilic substitution.

Such halomethylation typically employs the dissolution of the interpolymer in a suitable solvent to perform halomethylation. Generally, a suitable solvent is a compound which will not significantly react with any component in the reaction mixture. Preferably, the solvent is a liquid and remains a liquid at the conditions employed in the reaction. While different types of solvents may be used, preferred solvents include, for example, chlorinated hydrocarbons such as 1,2-dichloroethane, trichloromethane, methylene chloride, as well as, mixtures thereof. Often, the halomethyl ether reactant itself may be used in excess as a solvent.

Once dissolved, the interpolymer is then reacted with a halomethyl ether having the following structure:

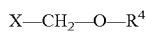

wherein X represents a halogen and $R^4$ represents an inert group.

X is preferably chloro, bromo, fluoro, or iodo. More preferably X is chloro or bromo. Most preferably X is chloro.

The $R^4$ group is not particularly critical so long as the halomethyl ether is capable of reacting with the interpolymer to form a halomethylated interpolymer. Thus, $R^4$ is an inert group with respect to the reactants and reaction conditions employed. Typically, $R^4$ is a group selected from substituted or unsubstituted hydrocarbyl. Preferably $R^4$ is an alkyl group. More preferably $R^4$ is an alkyl group having from one to 20 carbon atoms. Most preferably $R^4$ is an alkyl group having from one to six carbon atoms such as, for example, methyl or ethyl.

The specific halomethyl ether which is employed in the halomethylation reaction is generally selected based upon the halomethylated interpolymer which is desired. For example, if a chloromethylated interpolymer is desired then a chloromethyl ether is employed. Similarly, if a bromomethylated interpolymer is desired then a bromomethyl ether is employed.

Preferred halomethyl ethers include halomethyl alkyl ethers such as chloromethyl alkyl ethers and bromomethyl alkyl ethers, for example, chloromethyl methyl ether, chloromethyl ethyl ether, bromomethyl methyl ether, bromomethyl ethyl ether.

The halomethyl ether is preferably mixed with the dissolved interpolymer. However, as one skilled in the art will appreciate, the halomethyl ether may also first be dissolved in a suitable solvent and then the interpolymer may be dissolved in the same or a different solvent. Additionally, the halomethyl ether may be formed in situ.

The amount of halomethyl ether employed varies depending upon such factors as the type of interpolymer, the desired degree of halomethylation and the reaction conditions employed. Typically, the higher the desired degree of halomethylation then the more halomethyl ether which is required.

The degree of halomethylation may be defined as the mole percent of halomethylation per mole of polymer repeat unit containing an aromatic group. In the case of ethylene-styrene interpolymer for example, the degree of halomethylation is the mole percent of phenyl rings which have a halomethyl group attached. For ethylene-styrene interpolymers the mole percent may be from at least 1, preferably at least 5 to 80 percent or even as much as 100 or 200 percent. As one skilled in the art will appreciate if the degree of halomethylation is above 100 percent then some aromatic groups will have more than one halomethyl group substituent.

Generally, the para position of the phenyl ring is most active and the meta position is the least active. Thus, halomethyl substitution first occurs predominantly at the para position of the ethylene-styrene interpolymer and then at the ortho position. Both the degree of halomethylation and the position of substitution may be readily determined by NMR spectroscopy.

The interpolymer is preferably reacted with the halomethyl ether in the presence of a catalytic amount of a suitable catalyst. A suitable catalyst is a compound which is effective in catalyzing chloromethylation as described in, for example, G. A. Olah, *Friedel-Crafts and Related Reactions*, Vol. II, Part 2, p. 659, J. Wiley & Sons, N.Y., 1964. Preferably, such catalysts include mild Lewis acid catalysts such as tin tetrachloride, zinc chloride, and titanium tetrachloride.

The specific catalyst employed is not critical so long as the catalyst has the appropriate activity. As one skilled in the art will appreciate, the higher the desired degree of halomethylation then the more active a catalyst which may be necessary. In some circumstances the catalyst may be so active that crosslinking and/or gellation of the interpolymer may occur. If crosslinking is not desired then a moderating agent may be added in a sufficient amount to weaken the catalyst activity and reduce the crosslinking. Such moderating agents are compounds such as, for example, ethers. Thus, ethers such as alkyl ethers, aromatic ethers and mixtures thereof will often moderate the catalyst activity. A preferred ether which has shown effectiveness as a moderating agent is diethyl ether.

The amount of catalyst added will vary depending upon such factors as the particular catalyst employed, the type and amount of interpolymer and halomethyl ether being reacted, as well as, the desired degree of halomethylation. In general, however, the molar ratio of halomethyl ether to catalyst often determines the degree of halomethylation, as well as, the amount of crosslinking which occurs. Therefore, for most applications the molar ratio of halomethyl ether to catalyst is usually at least 5, preferably at least 10, more preferably at least 20. On the other hand, the molar ratio of halomethyl ether to catalyst is usually no more than 1000, preferably no more than 100, more preferably no more than 50.

The pressure and temperature of the halomethylation reaction should be regulated such that the reaction proceeds as desired. Typically, the reaction is carried out at ambient pressure. However, other pressures may be employed so long as the reaction is not hindered.

Many different temperatures may be employed. Typically, if the temperature is low then the reaction proceeds slowly. On the other hand, if the temperature is high then the reaction proceeds more quickly and may even result in crosslinking. In general, temperatures of at least −50° C., preferably at least 0° C., more preferably at least 10° C. may be employed. Correspondingly, temperatures of less than 100, preferably less than 50, more preferably less than 30° C. may be employed.

The reaction should be allowed to proceed until the desired degree of halomethylation has been reached. As one skilled in the art will appreciate, such times will vary depending upon the desired degree of halomethylation, as well as, the particular catalyst employed and the reaction conditions. Typically, higher degrees of halomethylation will require a longer reaction time. However, generally reaction times may be reduced by employing more halomethylating agent and/or more active catalysts and/or higher temperatures. Generally, the reaction time is at least 0.5, preferably at least 2, more preferably at least 8 hours. Correspondingly, the reaction time is usually less than 72, preferably less than 48, more preferably less than 24 hours.

The halomethylated interpolymer may be recovered by any suitable means. A particularly advantageous recovery method is to add a quenching amount of water when the desired degree of halomethylation has been reached. The water which is added is preferably at a temperature below that of the reaction and above the water's freezing point at the pressure employed in the reaction.

The actual amount and temperature of the water which is added is not critical so long as the reaction is quenched and a readily separable aqueous layer and an organic layer are formed. The organic layer comprises halomethylated interpolymer and solvent. The two layers may be separated and the halomethylated interpolymer may then be isolated from the organic layer and dried. While the isolation may be accomplished by any suitable means, a convenient means of isolation is precipitation.

The properties of the halomethylated resins usually differ widely depending upon the type of halogen, the type of interpolymer, and the extent of halomethylation. Generally, chloromethylation appears to have little effect on the glass transition temperature and the thermal stability of ethylene-styrene interpolymer. For example, the glass transition temperature of ethylene styrene copolymer containing 70 weight percent styrene increases from 26.5° C. to 29° C. when 44 mole percent of the phenyl groups are chloromethylated and the thermal stability appears comparable to that of the parent interpolymer.

Once the interpolymer has been halomethylated, the halomethyl groups may be transformed to other functional groups if desired. The transformation may occur in solution or in an interpolymer melt in, for example, an extruder. Numerous transformations are possible. For example, the halomethyl group can be used for simple crosslinking (by reaction with a Lewis acid, a dinucleophile or water or induced by radiation), reactive compatibilization with other polymers, or for introduction of a plethora of other functional groups onto the polymer backbone. Functional groups to which the halomethyl group can be transformed include, for example, phosphonium, ammonium, sulfonium, ester, hydroxyl, ether, amine, phosphine, thiol, cyano, carboxylic acid, amide, or a functional group derived from reaction with nucleophiles, and mixtures thereof within the interpolymer. Such functionalization from halomethyl groups has been described in, for example, U.S. Pat. No. 5,162,445; P. Hodge, "Polymers as Chemical Reagents", *Encyclopedia of Polymer Science and Engineering 2nd Edition*, pp. 618-658; and Monthead et al., "Chemical Transformations of Chloromethylated Polystyrene," *IMS-Review Macromolecular Chemical Physics*, 1988, pp. 503-592. Suitable such methods may be used to form the transformed interpolymers.

Testing Methods

Unless indicated otherwise, the following testing procedures are to be employed: Density is measured in accordance with ASTM D-792. The samples are annealed at ambient conditions for 24 hours before the measurement is taken.

Melt index ($I_2$), is measured in accordance with ASTM D-1238, condition 190° C./2.16 kg (formally known as "Condition (E)"). It should be understood that for some low molecular weight polymers their melt index could not be measured by this method due to the low molecular weight.

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min. and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in Journal of Polymer Science, Polymer Letters, Vol. 6, (621) 1968, to derive the following equation:

$$M_{polyethylene} = a*(M_{polystyrene})^b$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the ith fraction eluting from the GPC column.

Melt viscosity is determined in accordance with the following procedure using a Brookfield Laboratories DVII+ Viscometer in disposable aluminum sample chambers. The spindle used is a suitable spindle (for example, a SC-31 hot-melt spindle), for measuring viscosities in the range of from 10 to 100,000 centipoise. A cutting blade is employed to cut samples into pieces small enough to fit into the 1 inch wide, 5 inches long sample chamber. The sample is placed in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to about 300° F., with additional sample being added until the melted sample is about 1 inch below the top of the sample chamber. The viscometer apparatus is lowered and the spindle submerged into the sample chamber. Lowering is continued until brackets on the viscometer align on the Thermosel. The viscometer is turned on, and set to a shear rate which leads to a torque reading in the range of 30 to 60 percent. Readings are taken every minute for about 15 minutes, or until the values stabilize, which final reading is recorded.

Percent crystallinity is determined by differential scanning calorimetry using a Perkin-Elmer DSC 7. The percent crystallinity may be calculated with the equation:

$$\text{percent } C = (A/292 \text{ J/g}) \times 100,$$

wherein percent C represents the percent crystallinity and A represents the heat of fusion of the ethylene in Joules per gram (J/g).

EXAMPLES

General: All organometallic reactions and polymerizations were performed under a purified argon or nitrogen atmosphere in a Vacuum Atmospheres glove box, using glassware previously dried in a vacuum oven at 150° C. overnight. All solvents used were an hydrous, de-oxygenated and purified according to known techniques. All ligands and metal precursors were prepared according to procedures known to thus of skill in the art, for example, under inert atmosphere conditions, etc. Ethylene/styrene copolymerizations were carried out in a parallel pressure reactor, which is fully described in WO 00/09255, and U.S. Pat. No. 6,306,658.

High temperature Size Exclusion Chromatography (also known as gel permeation chromatography, "GPC") was performed using an automated "Rapid GPC" system as described in U.S. Pat. Nos. 6,175,409, 6,260,407, and 6,294,318. A series of two 30 cm×7.5 mm linear columns were used, with one column containing PLgel 10 um, MixB and the other column containing PLgel 5 um, MixC (available from Polymer Labs). The GPC system was calibrated using narrow polystyrene standards. The system was operated at a eluent flow rate of 1.5 mL/min and an oven temperature of 160° C. o-dichlorobenzene was used as the eluent. The polymer samples were dissolved 1,2,4-trichlorobenzene at a concentration of about 1 mg/mL. Between 40 μL and 200 μL of a polymer solution were injected into the system. The concentration of the polymer in the eluent was monitored using an evaporative light scattering detector. All of the molecular weight results obtained are relative to linear polystyrene standards.

Due to the low molecular weight of the ethylene-styrene copolymers produced by the catalyst systems described herein, the resolution obtainable using the Rapid GPC system is limited by the lower exclusion limit of the column material. Because the molecular weights of the products made in some embodiments of the invention are close to or below the lower size exclusion limit of the GPC columns, the $M_w$ (weight average molecular weight) and especially the $M_n$ (number average molecular weight) obtained by GPC are overestimated, while the polydispersity index ($PDI=M_w/M_n$) is underestimated, due to the lowest molecular weight fractions, which are below the size exclusion limit of the column material, eluting at approximately the same time as the higher molecular weight fractions which are at or slightly above the lower exclusion limit. The $M_w$ and PDI shown in Table 4b illustrate this dependence of measured PDI on molecular weight. However, in some embodiments, this may not be the case.

The ratio of styrene to ethylene incorporated in the polymer products, represented as the mol percent of styrene incorporated in the polymer (mol percent incorporated styrene) was determined using $^1$H NMR spectroscopy (described below). The total styrene content of the polymer products (mol percent total styrene), including both the styrene incorporated in the ethylene-styrene copolymer and any background homopolystyrene (PS) in the product sample, was determined using FTIR spectroscopy (linear regression method, described below).

$^1$H NMR method for determining mol percent styrene incorporation: The ratio of styrene to ethylene incorporated in the polymer products, represented as the mol percent (mole percent) of styrene incorporated in the polymer was determined using $^1$H NMR spectroscopy. NMR samples were prepared as a solution of 10-40 mg of polymer in 0.4-0.5 mL of a 50/50 mixture by volume of 1,1,2,2-tetrachloroethane-d2 (TCE-d2) and tetrachloroethylene (Perchlor). Depending on the specific polymer, the sample was heated to completely dissolve the polymer. NMR was taken at a temperature between 20 and 90° C., such that the sample was fully dissolved. Proton NMR spectra of samples were acquired on a Bruker 300 MHz NMR spectrometer. Abbreviations used below: iS=incorporated styrene (styrene incorporated into ethylene-styrene copolymer), aPS=atactic homopolystyrene, S=total styrene=iS+aPS, E=ethylene.

Data Analysis
The $^1$H NMR spectra are integrated using the following regions:

| | | |
|---|---|---|
| Styrene Aromatic = | 7.687–6.869 ppm = | region A |
| Atactic Polystyrene Aromatic = | 6.869–6.357 ppm = | region B |
| Vinyl Region = | 5.95–4.7 ppm = | region D |
| CH and CH$_2$ Aliphatic = | 3.212–1.0 ppm = | region E |
| Methyl = | 1.0–0.50 ppm = | region F |
| region C = | D + E + F | |

Calculations:

Moles Styrene=$N(S)$=(styrene region $A$+aPS region $B$)/5

Moles aPS=$N(aPS)$=(aPS region $B$)/2

Moles Ethylene=$N(E)$=(region $C$-$N(S)$*3)/4

$N(iS)/N(E)=N(S)-N(aPS)/N(E)$ wt. percent $E=N(E)*28/(N(E)*28+N(S)*104)$ wt. percent $S$ (total)=$N(S)*104/(N(E)*28+N(S)*104)$ wt. percent $aPS=N(APS)*104/(N(E)*28+N(S)*104)$ wt. percent $iS=(N(S)-N(aPS))*104/(N(E)*28+N(S)*104)$ molpercent $iS=(N(iS)/N(E))*100/(1+(N(iS)/N(E)))$ $N$(vinyl)=region $D/3$ Chain length=$(N(E)+N(iS))/N$(vinyl)

$iS$ units per chain=$(N(S)-N(aPS))/N$(vinyl)

$E$ units per chain=$N(E)/N$(vinyl)

Average molecular weight ($Mn$)=$iS$ units per chain*104+$E$ units per chain*28

FTIR method for determining mol percent total styrene in product: FTIR was performed on a Bruker Equinox 55+IR Scope II in reflection mode using a Pike MappIR accessory with 16 scans. The ratio of total styrene to ethylene was obtained from the ratio of band heights at 4330 cm$^{-1}$ and 1602 cm$^{-1}$. This method was calibrated using a set of ethylene-styrene copolymers with a range of known styrene content.

The total styrene content of the polymer products (mol percent total styrene), includes both the styrene incorporated in the ethylene-styrene copolymer and any background homopolystyrene (PS) in the product sample. For the ethylene-styrene copolymerization conditions employed in Examples 3 and 4, the homopolystyrene background level is less than 3.5 wt percent (1 mol percent) and decreases (in percentage terms) with increasing product yield. For the products made in some embodiments of the invention that were analyzed by $^1$H NMR, the homopolystyrene content was always below 3.5 weight percent (for Example 3.6, product yield=82 mg) and more typically below 2 weight percent for product yields or 100 mg or more.

Ligand Examples

The following ligands are used in some of these examples:

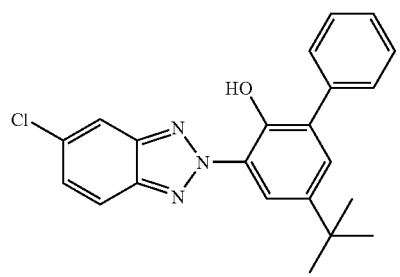

Ligand A

-continued

Ligand B

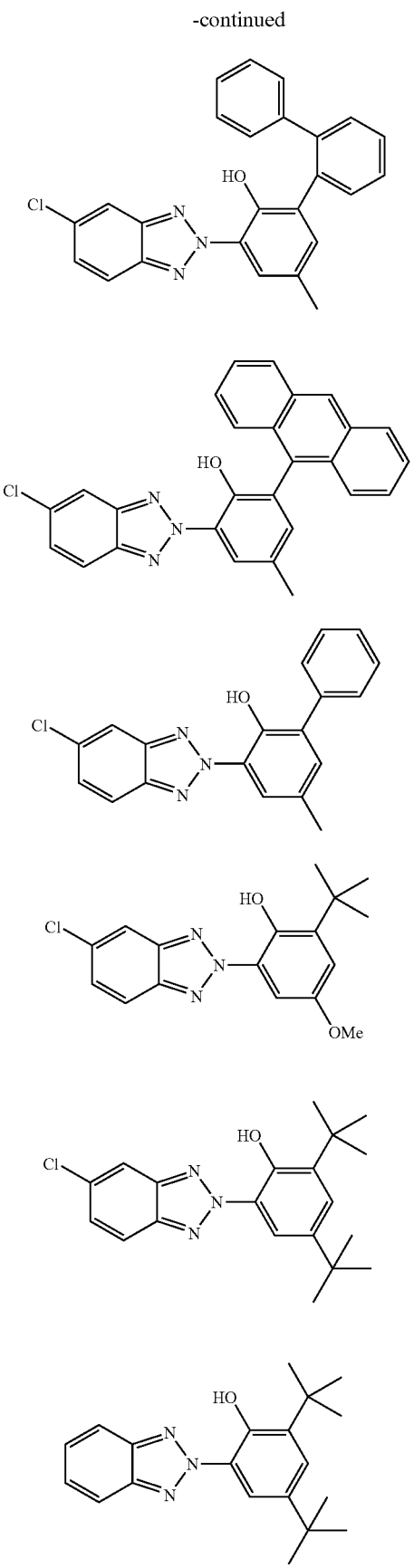

Ligand C

Ligand D

Ligand E

Ligand F

Ligand G

-continued

Ligand H

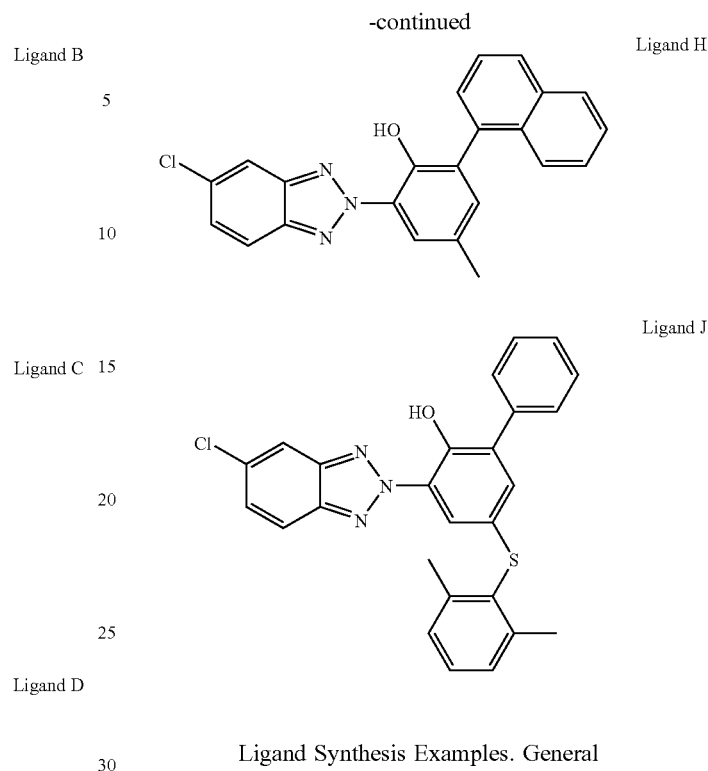

Ligand J

Ligand Synthesis Examples. General $^1$H NMR spectra were recorded on ligand solution in CDCl$_3$ and are reported relative to residual chloroform or TMS as the internal standard. Mass spectra were obtained by EI at 70 eV. Chromatography refers to flash chromatography on silica gel (230-400 mesh). All solvents used were anhydrous, and purified according to known techniques. All chemicals were purchased by Aldrich except for 4-tert.-butyl-2-phenylphenol (Avocado), xantphos and 2-(di-t-butylphosphino)biphenyl (Strem), and benzene boronic acid (Lancaster).

Example 1

Synthesis of Ligands

This example describes a general synthesis route that was used for the variety of ligands used herein, with the starting materials changed as appropriate.

SCHEME 1: Synthesis of Ligand A

Ligand A:

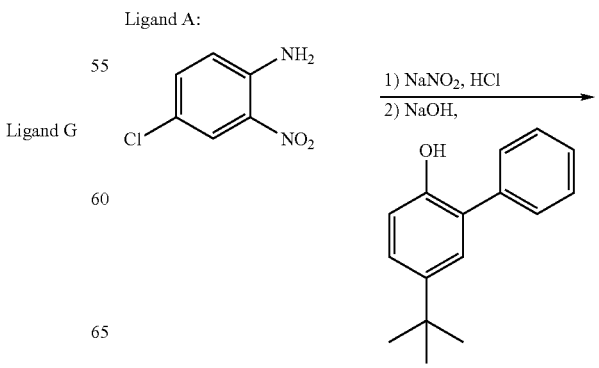

-continued

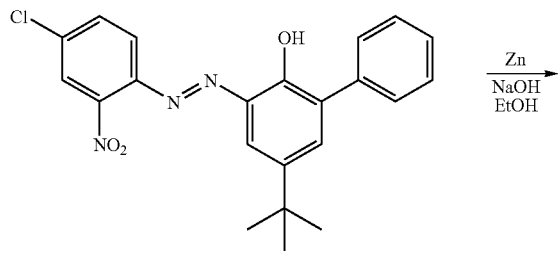

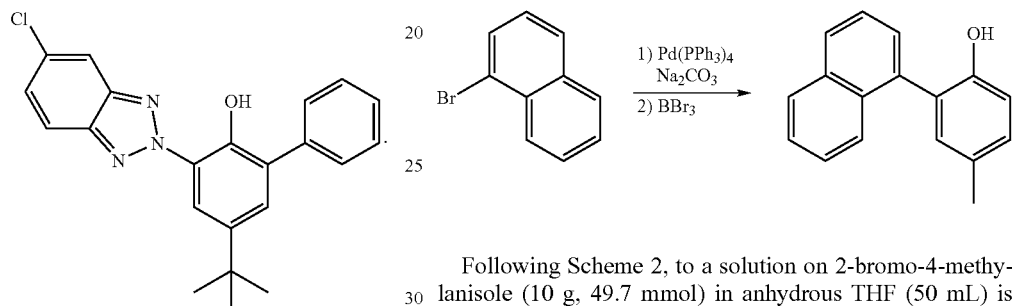

To a suspension of 4-chloro-2-nitroaniline (269 mg, 1.6 mmol) in HCl (37 percent, 4 mL) is added H$_2$O (1 mL) and NaNO$_2$ (720 μL of a 2.5 M solution in H$_2$O, 1.6 mmol) at 0° C. After stirring at room temperature for 10 minutes the resulting solution is added drop-wise to a solution of 4-tert-butyl-2-phenylphenol (362 mg, 1.6 mmol) and NaOH (2 g, 50 mmol) in H$_2$O (10 mL) and MeOH (10 mL) at 0° C. A precipitate forms which, after the addition is complete, is filtered, dissolved in ethyl acetate, washed with H$_2$O and brine, and dried over Na$_2$SO$_4$. After removal of the solvent, the solid is suspended in a mixture of EtOH (10 mL) and aqueous NaOH (7 mL of a 2 M solution in H$_2$O, 14 mmol). Zn (700 mg, 10.8 mmol) is added and the resulting mixture is stirred for 30 min at 90° C. After filtration, a solution of NH$_4$Cl in H$_2$O is added, the mixture is extracted with ethyl acetate, and the combined organic layers are washed with brine and dried over Na$_2$SO$_4$. Purification by column chromatography over silica gel using hexanes/methylene chloride (10/1) as eluent gives 145 mg (0.385 mmol, 24 percent) of the desired product as a yellow solid. $^1$H NMR (CDCl$_3$, 400 MHz): δ 11.38 (s, 1H), 8.39 (d, J=2.5 Hz, 1H), 7.92 (d, J=1.5 Hz, 1H), 7.87 (d, J=7 Hz, 1H), 7.64 (dd, J=1.5 Hz/7 Hz, 2H), 7.50-7.35 (m, 5H), 1.41 (s, 9H). One peak in GC-MS, m/z 377.

Ligands B, C, D, E, H and J were prepared following the synthetic methodology used for Ligand A. Ligand F was purchased from Aldrich (CAS registry # 3864-99-1), and Ligand G were purchased from Lancaster (CAS registry # 3864-71-7).

Synthesis of Phenols with Aryl Substitution at the 2-Position:

SCHEME 2: Synthesis of Ligand Precursor 1

Ligand Precursor 1:

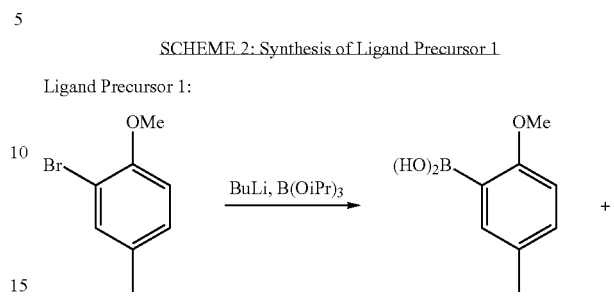

Following Scheme 2, to a solution on 2-bromo-4-methylanisole (10 g, 49.7 mmol) in anhydrous THF (50 mL) is added n-butyllithium (32.6 mL of a 1.6 M solution in hexanes, 52.2 mmol) at −78° C. After stirring at −78° C. for 10 minutes and at room temperature for 1 hour, the solution is cooled again to −78° C. and triisopropyl borate (12.6 mL, 52.2 mmol) is added slowly. After the solution is stirred at room temperature for 1 hour, a solution of NH$_4$Cl in H$_2$O is added. The mixture is extracted with ether, and the combined organic layers are washed with brine and dried over Na$_2$SO$_4$. The crude product is recrystallized from ether to give the 5.6 g of the boronic acid (33.7 mmol, 68 percent) as a white solid.

Under an atmosphere of argon, Na$_2$CO$_3$ (10 mL of a 2 M solution in H$_2$O, 20 mmol) is added to a solution of the boronic acid (3.73 g, 22.5 mmol), 1-bromonaphthalene (5 g, 20 mmol), and Pd(PPh$_3$)$_4$ (462 mg, 0.4 mmol) in DME (40 mL). After stirring for 12 hours at 80° C., H$_2$O is added and the resulting mixture is extracted with ether. The combined organic layers are washed with brine and dried over Na$_2$SO$_4$. After removal of the solvent, 5 g of the crude product is obtained.

The crude product is then dissolved in anhydrous methylene chloride (30 mL), and to this solution is then added a solution of BBr$_3$ (24 mL of a 1 M solution in methylene chloride, 24 mmol). After the solution is stirred at room temperature for 1 hour, brine is added. The mixture is extracted with methylene chloride, and the combined organic layers are washed with brine and dried over Na$_2$SO$_4$. Purification by column chromatography over silica gel using hexanes/ethyl acetate (10/1) as eluent gives 3.3 g (14.1 mmol, 71 percent) of the desired product as a yellow solid. $^1$H NMR (CDCl$_3$, 400 MHz): δ 7.95 (d, J=8 Hz, 2H), 7.71 (d, J=8 Hz, 1H), 7.62-7.45 (m, 4H), 7.21 (d, J=8 Hz, 1H), 7.11 (s, 1H), 6.98 (d, J=8 Hz, 1H), 2.39 (s, 3H). $^{13}$C NMR (CDCl$_3$, 100 MHz): δ 150.9, 134.2, 133.9, 131.8, 131.5, 130.0, 129.7, 128.7, 128.4 (2×), 128.1, 126.7, 126.3, 126.0, 125.7, 115.3, 20.5. One peak in GC-MS, m/z 234.

Synthesis of Phenols with Variation in the 2- and 4-Position:

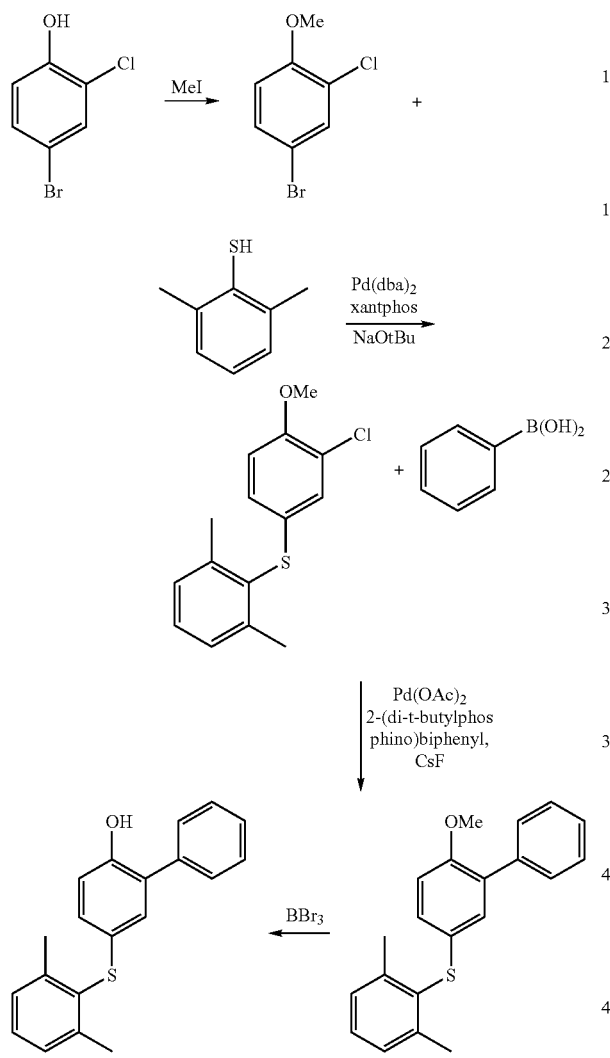

Following Scheme 3, a mixture of 4-bromo-2-chlorophenol (4.66 g, 22.45 mmol), iodomethane (3.1 mL, 50 mmol), and powdered $K_2CO_3$ (13.8 g, 100 mmol) in acetone (20 mL) is stirred at 65° C. for 1 hour. After filtration and removal of the solvent, 4.3 g (19.4 mmol, 86 percent) of 4-bromo-2-chloroanisole are obtained as a white solid.

The 4-bromo-2-chloroanisole (1 g, 4.52 mmol), plus 2,6-dimethylbenzenethiol (640 μL, 4.8 mmol) and NaOtBu (770 mg, 8 mmol) are then added to a solution of Pd(dba)$_2$ (60 mgs, 0.1 mmol) and xantphos (120 mg, 0.2 mmol) in toluene (10 mL). After stirring the resulting mixture at 110° C. for 3 h, a solution of $NH_4Cl$ in $H_2O$ is added, the mixture is extracted with hexanes, and the combined organic layers are washed with brine and dried over $Na_2SO_4$. Purification by column chromatography over silica gel using hexanes/ethyl acetate (10/1) as eluent gives 1.15 g (4.14 mmol, 92 percent) of the desired anisole thioether as a yellow oil. To a solution of Pd(OAc)$_2$ (11 mg, 0.05 mmol) and 2-(di-t-butylphosphino)biphenyl (30 mg, 0.1 mmol) in THF (3 mL) is added the anisole thioether (278 mg, 1 mmol), benzene boronic acid (183 mg, 1.5 mmol) and CsF (456 mgs, 3 mmol). The resulting mixture is stirred at room temperature for 16 h, at 60° C. for 4 hours, and then filtered. Purification by column chromatography over silica gel using hexanes/ethyl acetate (20/1) as eluent gives 293 mg (0.92 mmol, 92 percent) of the desired 2-phenyl-substituted anisole thioether as a yellow solid (the crude product).

To a solution of the crude product in anhydrous methylene chloride (5 mL) is added BBr$_3$ (1.5 mL of a 1 M solution in methylene chloride, 1.5 mmol). After the solution is stirred at room temperature for 30 minutes, brine is added. The mixture is extracted with methylene chloride, and the combined organic layers are washed with brine and dried over $Na_2SO_4$. Purification by column chromatography over silica gel using hexanes/ethyl acetate (20/1) as eluent gives 143 mg (0.47 mmol, 47 percent) of the desired product as a yellow solid. $^1$H NMR (CDCl$_3$, 400 MHz): δ 7.53-7.37 (3, 6H), 7.25-7.12 (m, 2H), 6.97 (dd, J=1.3 Hz/1.3 Hz, 1H), 6.83 (dd, J=1.3 Hz/1.3 Hz, 2H), 5.12 (s, 1H), 2.48 (s, 6H). One peak in GC-MS, m/z 306.

Example 2

Synthesis of Metal-Ligand Complexes

The following complexes are prepared herein (Bz=benzyl=CH$_2$Ph):

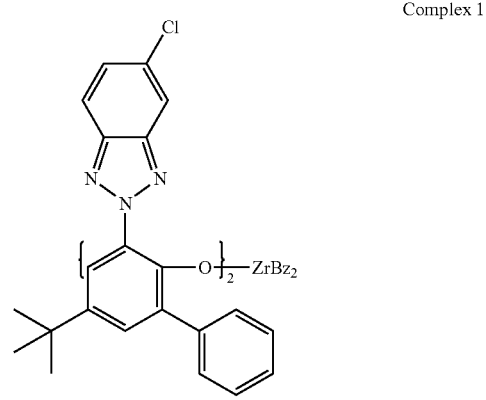

Complex 1

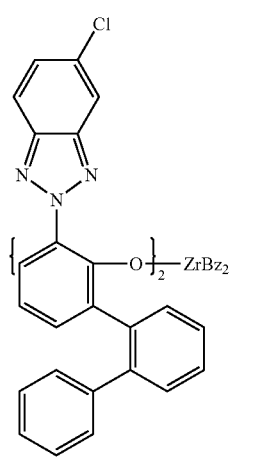

Complex 2

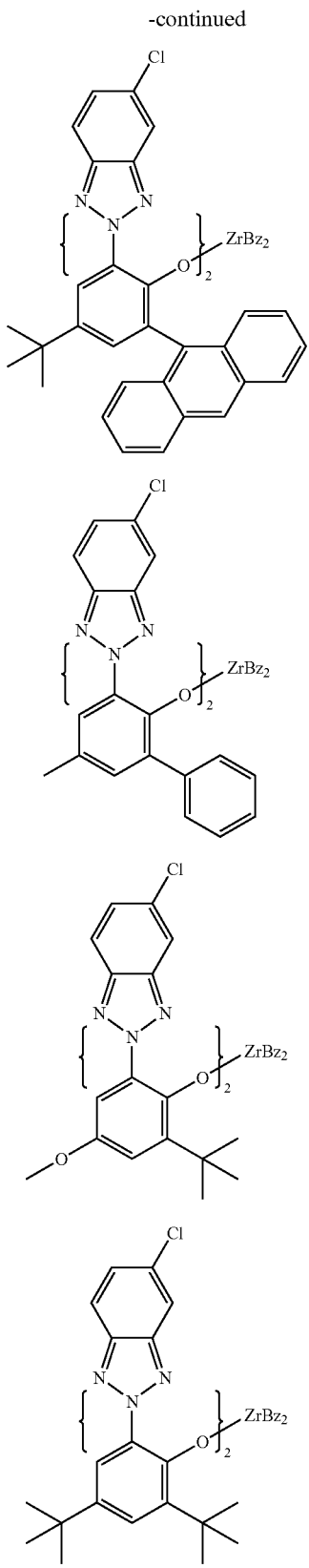

Complex 3

Complex 4

Complex 5

Complex 6

Complex 1. Ligand A (630 mg, 1.67 mmol) was dissolved in C$_6$D$_6$ (3 mL). Solid Zr(CH$_2$Ph)$_4$ (380 mg, 0.84 mmol) was added and the mixture was heated to 60° C. for 1 hour. The solvent was removed, and the resulting red-orange solid was extracted into boiling pentane (15 mL) and filtered. The volume of the filtrate was reduced to 5 mL and the filtrate was cooled to −35° C. overnight. An orange precipitate was collected, washed with cold pentane and dried in vacuo (565 mg, 65 percent yield). $^1$H NMR (C$_6$D$_6$, 25 C): δ 8.50 (s, 2H, OAr), 7.94 (d, 4H, benzotriazole Ar), 7.69 (s, 2H, OAr or benzoltriazole Ar), 7.45 (s, 2H, OAr or benzoltriazole Ar), 7.1–7.5 (overlapping m, 10H, CH$_2$Ph), 6.2–6.7 (m, 10H, Ph), 2.4 (dd, Zr(CH$_2$Ph), 1.28 (s, 18H, tBu).

Complex 2: In a manner similar to that described for Complex 1, Complex 2 was prepared from ligand B (77 mg, 0.19 mmol) and Zr(CH$_2$Ph)$_4$ (46 mg, 0.10 mmol). $^1$H NMR data was consistent with the proposed formula.

Complex 3: In a manner similar to that described for Complex 1, Complex 3 was prepared from ligand C (88 mg, 0.20 mmol) and Zr(CH$_2$Ph)$_4$ (46 mg, 0.10 mmol). $^1$H NMR data was consistent with the proposed formula.

Complex 4: In a manner similar to that described for Complex 1, Complex 4 was prepared from ligand D (71 mg, 0.21 mmol) and Zr(CH$_2$Ph)$_4$ (48 mg, 0.11 mmol). $^1$H NMR data was consistent with the proposed formula.

Complex 5: In a manner similar to that described for Complex 1, Complex 5 was prepared from ligand E (75 mg, 0.23 mmol) and Zr(CH$_2$Ph)$_4$ (58 mg, 0.13 mmol). $^1$H NMR data was consistent with the proposed formula.

Complex 6: In a manner similar to that described for Complex 1, Complex 6 was prepared from ligand F (371 mg, 1.04 mmol) and Zr(CH$_2$Ph)$_4$ (225 mg, 0.50 mmol). $^1$H NMR data was consistent with the proposed formula.

Examples 3-4

Ethylene-Styrene Copolymerization Experiments

The polymerization reactions were carried out in a parallel pressure reactor (which is described in the patent and patent applications cited above) located within an inert atmosphere drybox. The premixing of the metal-ligand complex or composition with alkyl (group 13 reagent) and activator solutions was performed in an array of 1 mL vials located adjacent to the parallel pressure reactor in the inert atmosphere drybox. A liquid dispensing robot was used to add/remove liquids to/from the 1 mL vials and to inject solutions and liquid reagents into the parallel pressure reactor.

Preparation of the polymerization reactor prior to injection of catalyst composition: A pre-weighed glass vial insert and disposable stirring paddle were fitted to each reaction vessel of the reactor. The reactor was then closed, 0.10 mL of a 0.02 M solution in toluene of the same group 13 reagent used as the "premix alkyl" for each example, followed by 3.8 mL of toluene, were injected into each pressure reaction vessel through a valve. The temperature was then set to 110° C., and the stirring speed was set to 800 rpm, and the mixture was exposed to ethylene at 100 psi pressure. A ethylene pressure of 100 psi in the pressure cell and the temperature setting were maintained, using computer control, until the end of the polymerization experiment.

Preparation of the premix alkyl and activator stock solutions: The activator solution is a 2.5 mM solution of [PhNMe$_2$H]$^+$[B(C$_6$F$_5$)$_4$]$^-$ (N,N'-dimethylanilinium tetrakis(pentafluorophenyl)borate, "ABF20") in toluene heated to approximately 85° C. to dissolve the reagent, or a 2.5 mM toluene solution of [PhN((CH$_2$)$_n$·CH$_3$)$_2$H]$^+$[B(C$_6$F$_5$)$_4$]$^-$ 0 (where n" is 14, 16 or 18, shown in table 2a as [PhNR$_2$H]$^+$

[B(C$_6$F$_5$)$_4$]$^-$) or a 7.5 mM toluene solution of B(C$_6$F$_5$)$_3$. The premix alkyl ("group 13 reagent") solution is either a 0.050 M solution of Akzo-Nobel polymethylaluminoxane-improved process (PMAO-IP) or a 0.050 M solution of Akzo-Nobel modified methylaluminoxane-3A (MMAO), or a 0.20 M solution of diisobutyl aluminum hydride (DIBAL-H). All "group 13 reagent" solutions were solutions in toluene. See also WO 02/02577 for activator synthesis for examples 3.7, 3.8, 3.9 and 3.11.

Polymerization: After injection of solutions into the pressure reactor vessel (described below) the polymerization reactions were allowed to continue at 110° C. polymerization temperature for the time shown in tables 1b, 2b, 3b and 4b (shown for each example as "Run time"), during which time the temperature and pressure were maintained at their pre-set levels by computer control. The polymerization times were the lesser of the maximum desired polymerization reaction time or the time taken for a predetermined amount of ethylene gas to be consumed in the polymerization reaction. After the reaction time elapsed, the reaction was quenched by addition of an overpressure of carbon dioxide sent to the reactor.

Product work-up: After the polymerization reaction, the glass vial insert, containing the polymer product and solvent, was removed from the pressure cell and removed from the inert atmosphere dry box, and the volatile components were removed using a centrifuge vacuum evaporator. After most of the volatile components had evaporated, the vial contents were dried thoroughly in a vacuum oven at 75° C. The vial was then weighed to determine the yield of polymer product. The polymer product was then analyzed by rapid GPC, as described above to determine the molecular weight of the polymer produced, and by FTIR spectroscopy to determine the styrene content. Selected samples were additionally analyzed using $^1$H NMR spectroscopy for styrene incorporation and vinyl end group content.

Example 3

Ethylene-Styrene Copolymerization Using Metal-Ligand Complexes 12 polymerization reactions were carried out with different metal-ligand complexes for the copolymerization of ethylene and styrene. For the following descriptions, the volumes of the reagent solutions added to the 1 mL vial and to the pre-pressurized polymerization reaction vessel are shown in Tables 1a and 2a. Polymerization results and product data are shown in Tables 1b and 2b.

Injection of solutions into the pressure reactor vessel (after "preparation of the polymerization reactor" and immediately prior to "polymerization") for Example 3.1-3.12.: First, the appropriate amount ("premix alkyl volume") of the 0.050 M group 13 reagent solution (for example 0.040 mL of 0.050 M solution of PMAO-IP for Example 3.1) was dispensed into a 1 mL vial. Then the appropriate amount of the toluene solution of the metal-ligand complex ("complex volume") was added to the 1 mL vial (for example 0.080 mL of a 5 mM solution (0.40 μmol) of Complex 1 for Example 3.1). This mixture was held at room temperature for 1 minute, during which time 0.420 mL of styrene followed immediately by 0.380 mL of toluene were injected into the pre-pressurized reaction vessel. Then, an appropriate amount ("activator volume") of the activator solution (for example 0.176 mL of a 2.5 mM toluene solution (0.44 μmol) of N,N'-dimethylanilinium tetrakis(pentafluorophenyl)borate ("ABF20") for Example 3.1) was added to the 1 mL vial. For Example 3.6, 0.40 mL of toluene was added to the 1 mL vial prior to addition of the other reagents, bringing the total volume of the 1 mL via contents to 0.724 mL after addition of the premix alkyl, complex and activator solutions. For Example 3.12, 0.185 mL of toluene was added to the 1 mL vial prior to addition of the other reagents, bringing the total volume of the 1 mL via contents to 0.370 mL after addition of the premix alkyl, complex and activator solutions. After 30 seconds, an appropriate volume (the "injection volume", calculated as the total volume of the 1 mL vial contents multiplied by the "injection fraction") was aspirated from the 1 mL vial and injected into the pre-pressurized reaction vessel (for example for Example 3.1 this corresponds to a total volume of 0.296 mL multiplied an "injection fraction" of 0.25, providing an injection volume of 0.074 mL, corresponding 0.10 μmol of the complex), followed immediately by approximately 0.7 mL of toluene injected into the pre-pressurized polymerization reaction vessel, to bring the total solution volume in the pressurized reaction vessel to 5.5 mL. The polymerization and product work-up were then performed as described above.

Example 4

Preparation of Ligand/Metal Compositions and Ethylene/Styrene Copolymerizations Using Ligand/Metal Compositions For the following descriptions, the volumes of the reagent solutions added to the 1 mL vial and to the pre-pressurized polymerization reaction vessel are shown in Tables 3a and 4a. Polymerization results and product data are shown in Tables 3b and 4b.

In situ preparation of metal-ligand compositions: Stock solutions were prepared as follows: The "metal precursor solution" is a 10 mM solution of Zr(CH$_2$Ph)$_4$ or Hf(CH$_2$Ph)$_4$ or Zr(NMe$_2$)$_4$ or Hf(NMe$_2$)$_4$ in toluene. The "ligand solutions" are 25 mM solutions of the representative ligands in toluene, (0.80 μmol), prepared in an array of 1 mL glass vials by dispensing 0.032 mL of a 25 mM ligand solution (0.80 μmol) in a 1 mL glass vial. To each 1 mL glass vial containing ligand/toluene solution was added 0.040 mL of the metal precursor solution (0.40 μmol), to form the metal-ligand combination solution.

For Examples 4.1-4.4 and 4.6-4.9 the reaction mixtures we heated to 70° C. for 1 hour, after which time the products were cooled to ambient temperature. Prior to addition of alkylation and activator solution, the volume of the metal-ligand combination solution (which was reduced due to solvent evaporation) was measured, and this "initial solvent volume" was used in subsequent calculations of vial contents total volume and the "injection volume". For Examples 4.3 and 4.4 an additional 0.10 mL of toluene was added to the 1 mL vial at this stage.

For Examples 4.5 and 4.10 the reaction mixtures were heated to 80° C. for 1.5 hours, after which time the products were cooled to ambient temperature. The reaction mixtures were then dried completely by blowing a stream of argon over the 1 ml vial. Prior to addition of the premix alkyl (group 13 reagent) solution and activator solution, a volume of toluene (shown in table 3a as "initial solvent volume") was added to 1 mL vial containing the metal-ligand combination solution. This "initial solvent volume" was used in subsequent calculations of vial contents total volume and the "injection volume".

Injection of solutions into the pressure reactor vessel (after "preparation of the polymerization reactor" and immediately prior to "polymerization") for Examples 4.1-4.10: To the ligand-metal composition, a volume (shown in Table 3a or 4a for each example) of a 500 mM solution of 1-octene in toluene was added. Then, an appropriate amount of the group 13-reagent solution (shown in Table 3a or 4a for each example) was added to the 1 mL vial. This mixture was held at room temperature either for 1 minute for Examples 4.1-4.4 and 4.6-4.9, or for 10 minutes for Examples 4.5 and 4.10, during which time 0.420 mL of styrene followed immediately by 0.380 mL of toluene, were injected into the pre-pressurized reaction vessel. Then, an appropriate amount of the "activator solution" (shown in Table 3a or 4a for each example) was added to the 1 mL vial. After a wait time of 30 seconds, a fraction (the "injection fraction" shown in Table 3a or 4a) of the total volume of the 1 mL vial contents (the "injection volume") was injected into the pre-pressurized reaction vessel, followed immediately by approximately 0.7 mL of toluene, to bring the total solution volume in the pressurized reaction vessel to 5.5 mL. The polymerization and product work-up were then performed as described above.

TABLE 1a

Ethylene-Styrene Copolymerization Experiments using isolated complexes: Solution Premix and Injection Details

| Example # | 3.1 | 3.2 | 3.3 | 3.4 | 3.5 | 3.6 |
|---|---|---|---|---|---|---|
| Complex # | 1 | 3 | 3 | 2 | 2 | 6 |
| Complex solution concentration (M) | 0.005 | 0.005 | 0.005 | 0.005 | 0.005 | 0.004 |
| Complex Volume (mL) | 0.080 | 0.080 | 0.080 | 0.080 | 0.080 | 0.100 |
| μmol of complex added to 1 mL vial | 0.40 | 0.40 | 0.40 | 0.40 | 0.40 | 0.40 |
| Premix Alkyl (group 13 reagent) | PMAO-IP | PMAO-IP | PMAO-IP | PMAO-IP | MMAO | PMAO-IP |
| Premix Alkyl Volume (mL) | 0.040 | 0.040 | 0.040 | 0.040 | 0.040 | 0.048 |
| Premix Alkyl/Zr ratio | 5/1 | 5/1 | 5/1 | 5/1 | 5/1 | 6/1 |
| Activator | ABF20 | ABF20 | ABF20 | ABF20 | ABF20 | ABF20 |
| Activator Volume (mL) | 0.176 | 0.176 | 0.176 | 0.176 | 0.176 | 0.176 |
| Activator/Zr ratio | 1.1/1 | 1.1/1 | 1.1/1 | 1.1/1 | 1.1/1 | 1.1/1 |
| Injection Fraction | 0.25 | 0.25 | 0.125 | 0.125 | 0.125 | 0.0075 |
| Injection Volume (mL) | 0.074 | 0.074 | 0.037 | 0.037 | 0.037 | 0.005 |
| μmol Zr injected into reactor | 0.10 | 0.10 | 0.05 | 0.05 | 0.05 | 0.003 |

TABLE 1b

Ethylene-Styrene Copolymerization Experiments using isolated complexes: Polymerization Details and Results

| Example # | 3.1 | 3.2 | 3.3 | 3.4 | 3.5 | 3.6 |
|---|---|---|---|---|---|---|
| Complex # | 1 | 3 | 3 | 2 | 2 | 6 |
| μmol Zr injected into reactor | 0.10 | 0.10 | 0.05 | 0.05 | 0.05 | 0.003 |
| Run Time (Minutes) | 10.7 | 3.1 | 5.5 | 9.2 | 4.1 | 10.0 |
| Polymer Yield (mg) | 202 | 148 | 124 | 140 | 166 | 82 |
| Activity (mg polymer per μmol per minute) | 188 | 479 | 454 | 305 | 815 | 2717 |
| mol percent incorporated Styrene by $^1$H NMR | 11.1 | 10.0 | 9.4 | 9.8 | 11.1 | 4.9 |
| Average # Styrene units per chain (by $^1$H NMR) | 2.5 | 1.3 | 1.2 | 1.3 | 1.5 | 1.3 |
| Average # Ethylene units per chain (by $^1$H NMR) | 20 | 12 | 12 | 12 | 12 | 25 |
| Average # monomer units per chain (by $^1$H NMR) | 22 | 13 | 13 | 13 | 13 | 27 |
| Mn by $^1$H NMR | 810 | 460 | 450 | 460 | 480 | 840 |
| Ratio of methyl/vinyl region integrations ($^1$H NMR) | 1.0 | 0.9 | 0.8 | 0.9 | 0.9 | 1.1 |
| mol percent total styrene by FTIR (linear regression) | 12.9 | 12.3 | 11.2 | 12.3 | 13.1 | 6.2 |
| Mw × 10$^{-3}$ (by GPC) | 3.4 | 2.4 | 2.5 | 3.0 | 3.0 | 2.2 |
| Mw/Mn (by GPC) | 1.5 | 1.4 | 1.4 | 1.4 | 1.5 | 1.3 |

TABLE 2a

Ethylene-Styrene Copolymerization Experiments using isolated complexes: Solution Premix and Injection Details

| Example # | 3.7 | 3.8 | 3.9 | 3.10 | 3.11 | 3.12 |
|---|---|---|---|---|---|---|
| Complex # | 1 | 3 | 2 | 1 | 4 | 5 |
| Complex solution concentration (M) | 0.005 | 0.005 | 0.005 | 0.005 | 0.005 | 0.004 |
| Complex Volume (mL) | 0.080 | 0.080 | 0.080 | 0.050 | 0.050 | 0.050 |
| μmol of complex added to 1 mL vial | 0.40 | 0.40 | 0.40 | 0.25 | 0.25 | 0.20 |
| Premix Alkyl (group 13 reagent) | PMAO-IP | PMAO-IP | MMAO | MMAO | MMAO | MMAO |

TABLE 2a-continued

Ethylene-Styrene Copolymerization Experiments using isolated complexes: Solution Premix and Injection Details

| Example # | 3.7 | 3.8 | 3.9 | 3.10 | 3.11 | 3.12 |
|---|---|---|---|---|---|---|
| Premix Alkyl Volume (mL) | 0.040 | 0.040 | 0.040 | 0.025 | 0.025 | 0.025 |
| Premix Alkyl/Zr ratio | 5/1 | 5/1 | 5/1 | 5/1 | 5/1 | 5/1 |
| Activator | $[PhNR_2H]^+$ $[B(C_6F_5)_4]^-$ | $[PhNR_2H]^+$ $[B(C_6F_5)_4]^-$ | $[PhNR_2H]^+$ $[B(C_6F_5)_4]^-$ | $B(C_6F_5)_3$ | $[PhNR_2H]^+$ $[B(C_6F_5)_4]^-$ | $B(C_6F_5)_3$ |
| Activator Volume (mL) | 0.176 | 0.176 | 0.176 | 0.110 | 0.110 | 0.110 |
| Activator/Zr ratio | 1.1/1 | 1.1/1 | 1.1/1 | 3.3/1 | 1.1/1 | 3.3/1 |
| Injection Fraction | 0.125 | 0.125 | 0.125 | 0.40 | 0.40 | 0.063 |
| Injection Volume (mL) | 0.037 | 0.037 | 0.037 | 0.074 | 0.074 | 0.023 |
| μmol Zr injected into reactor | 0.050 | 0.050 | 0.050 | 0.10 | 0.10 | 0.013 |

TABLE 2b

Ethylene-Styrene Copolymerization Experiments using isolated complexes.

| Example # | 3.7 | 3.8 | 3.9 | 3.10 | 3.11 | 3.12 |
|---|---|---|---|---|---|---|
| Complex # | 1 | 3 | 2 | 1 | 4 | 5 |
| μmol Zr injected into reactor | 0.050 | 0.050 | 0.050 | 0.10 | 0.10 | 0.013 |
| Run Time (Minutes) | 5.6 | 6.1 | 2.7 | 5.0 | 3.9 | 5.7 |
| Polymer Yield (mg) | 225 | 122 | 193 | 219 | 232 | 154 |
| Activity (mg polymer per μmol Zr per minute) | 797 | 396 | 1428 | 438 | 589 | 2140 |
| Mol percent total styrene by FTIR (linear regression) | 14.0 | 11.4 | 14.0 | 13.4 | 14.8 | 4.8 |
| Mw by GPC | | | | 2700 | 2500 | 3000 |
| PDI by GPC | | | | 1.2 | 1.2 | 1.2 |

TABLE 3a

In-situ preparation of zirconium metal-ligand compositions and solution premix and injection details.

| Example # | 4.1 | 4.2 | 4.3 | 4.4 | 4.5 |
|---|---|---|---|---|---|
| Metal Precursor | $Zr(CH_2Ph)_4$ | $Zr(CH_2Ph)_4$ | $Zr(CH_2Ph)_4$ | $Zr(CH_2Ph)_4$ | $Zr(NMe_2)_4$ |
| Ligand | Ligand D | Ligand C | Ligand E | Ligand G | Ligand C |
| Metal Precursor Solution Concentration (M) | 0.010 | 0.010 | 0.010 | 0.010 | 0.010 |
| Metal Precursor Volume (mL) | 0.040 | 0.040 | 0.040 | 0.040 | 0.040 |
| μmol of metal added to 1 mL vial | 0.40 | 0.40 | 0.40 | 0.40 | 0.40 |
| Ligand Solution concentration (M) | 0.025 | 0.025 | 0.025 | 0.025 | 0.025 |
| Ligand Solution Volume (mL) | 0.032 | 0.032 | 0.032 | 0.032 | 0.032 |
| μmol of Ligand added to 1 mL vial | 0.080 | 0.080 | 0.080 | 0.080 | 0.080 |
| Complexation Time | 1 hour | 1 hour | 1 hour | 1 hour | 1.5 hours |
| Complexation Temperature | 70° C. | 70° C. | 70° C. | 70° C. | 80° C. |
| Solvent volume lost to evaporation | 0.030 | 0.030 | 0.030 | 0.030 | 0.080 |
| Volume of Solvent Added to vial (mL) | 0 | 0 | 0.100 | 0.100 | 0.070 |
| Initial Solvent Volume (mL) | 0.050 | 0.050 | 0.150 | 0.150 | 0.070 |
| Volume of 0.5 M 1-octene solution added to vial (mL) | 0.024 | 0.024 | 0.024 | 0.024 | 0.024 |
| Premix Alkyl (group 13 reagent) | MMAO | MMAO | MMAO | PMAO-IP | DIBAL-H |
| Premix Alkyl concentration (M) | 0.050 | 0.050 | 0.050 | 0.050 | 0.20 |
| Premix Alkyl Volume (mL) | 0.048 | 0.048 | 0.048 | 0.048 | 0.060 |
| Premix Alkyl/Zr ratio | 6/1 | 6/1 | 6/1 | 6/1 | 30/1 |
| Activator (2.5 mM) | ABF20 | ABF20 | ABF20 | ABF20 | ABF20 |
| Activator Volume (mL) | 0.176 | 0.176 | 0.176 | 0.176 | 0.176 |
| Activator/Zr ratio | 1.1/1 | 1.1/1 | 1.1/1 | 1.1/1 | 1.1/1 |
| Injection Fraction | 0.050 | 0.050 | 0.025 | 0.025 | 0.25 |
| Injection Volume (mL) | 0.015 | 0.015 | 0.010 | 0.010 | 0.083 |
| μmol Zr injected into reactor | 0.020 | 0.020 | 0.010 | 0.010 | 0.10 |

TABLE 3b

Results of ethylene-styrene copolymerizations employing zirconium metal-ligand compositions.

| Example # | 4.1 | 4.2 | 4.3 | 4.4 | 4.5 |
|---|---|---|---|---|---|
| Metal Precursor | $Zr(CH_2Ph)_4$ | $Zr(CH_2Ph)_4$ | $Zr(CH_2Ph)_4$ | $Zr(CH_2Ph)_4$ | $Zr(NMe_2)_4$ |
| Ligand | Ligand D | Ligand C | Ligand E | Ligand G | Ligand C |
| μmol Zr injected into reactor | 0.020 | 0.020 | 0.010 | 0.010 | 0.10 |
| Run Time (Minutes) | 15.0 | 3.6 | 2.3 | 1.5 | 3.1 |
| Polymer Yield (mg) | 105 | 128 | 211 | 141 | 108 |
| Activity (mg polymer per μmol Zr per minute) | 348 | 1801 | 9183 | 9200 | 347 |
| mol percent incorporated Styrene by $^1$H NMR | 10.3 | 10.1 | — | — | — |
| mol percent total styrene by FTIR (linear regression) | 12.1 | 12.8 | 8.2 | 6.6 | 13.7 |
| Mw by GPC | 3200 | 2400 | 3600 | 2600 | |
| Mw/Mn by GPC | 1.2 | 1.2 | 1.3 | 1.2 | |

TABLE 4a

In-situ preparation of hafnium metal-ligand compositions and solution premix and injection details.

| Example # | 4.6 | 4.7 | 4.8 | 4.9 | 4.10 |
|---|---|---|---|---|---|
| Metal Precursor | $Hf(CH_2Ph)_4$ | $Hf(CH_2Ph)_4$ | $Hf(CH_2Ph)_4$ | $Hf(CH_2Ph)_4$ | $Hf(NMe_2)_4$ |
| Ligand | Ligand D | Ligand C | Ligand E | Ligand G | Ligand C |
| Metal Precursor Solution concentration (M) | 0.010 | 0.010 | 0.010 | 0.010 | 0.010 |
| Metal Precursor Volume (mL) | 0.040 | 0.040 | 0.040 | 0.040 | 0.040 |
| μmol of metal added to 1 mL vial | 0.40 | 0.40 | 0.40 | 0.40 | 0.40 |
| Ligand Solution concentration (M) | 0.025 | 0.025 | 0.025 | 0.025 | 0.025 |
| Ligand Solution Volume (mL) | 0.032 | 0.032 | 0.032 | 0.032 | 0.032 |
| μmol of Ligand added to 1 mL vial | 0.080 | 0.080 | 0.080 | 0.080 | 0.080 |
| Complexation Time | 1 hour | 1 hour | 1 hour | 1 hour | 1.5 hours |
| Complexation Temperature | 70° C. | 70° C. | 70° C. | 70° C. | 80° C. |
| Solvent volume lost to evaporation | 0.030 | 0.030 | 0.030 | 0.030 | 0.080 |
| Volume of Solvent Added to vial (mL) | 0 | 0 | 0 | 0 | 0.070 |
| Initial Solvent Volume (mL) | 0.050 | 0.050 | 0.050 | 0.050 | 0.070 |
| Volume of 0.5 M 1-octene solution added to vial (mL) | 0.024 | 0.024 | 0.024 | 0.024 | 0.024 |
| Premix Alkyl (group 13 reagent) | MMAO | MMAO | MMAO | PMAO-IP | DIBAL-H |
| Premix Alkyl concentration (M) | 0.050 | 0.050 | 0.050 | 0.050 | 0.20 |
| Premix Alkyl Volume (mL) | 0.048 | 0.048 | 0.048 | 0.048 | 0.060 |
| Premix Alkyl/Zr ratio | 6/1 | 6/1 | 6/1 | 6/1 | 30/1 |
| Activator (2.5 mM) | ABF20 | ABF20 | ABF20 | ABF20 | ABF20 |
| Activator Volume (mL) | 0.176 | 0.176 | 0.176 | 0.176 | 0.176 |
| Activator/Zr ratio | 1.1/1 | 1.1/1 | 1.1/1 | 1.1/1 | 1.1/1 |
| Injection Fraction | 0.25 | 0.25 | 0.25 | 0.05 | 0.50 |
| Injection Volume (mL) | 0.075 | 0.075 | 0.075 | 0.015 | 0.165 |
| μmol Zr injected into reactor | 0.10 | 0.10 | 0.10 | 0.020 | 0.20 |

TABLE 4b

Results of ethylene-styrene copolymerizations employing hafnium metal-ligand compositions.

| Example # | 4.6 | 4.7 | 4.8 | 4.9 | 4.10 |
|---|---|---|---|---|---|
| Metal Precursor | $Hf(CH_2Ph)_4$ | $Hf(CH_2Ph)_4$ | $Hf(CH_2Ph)_4$ | $Hf(CH_2Ph)_4$ | $Hf(NMe_2)_4$ |
| Ligand | Ligand D | Ligand C | Ligand E | Ligand G | Ligand C |
| μmol Hf injected into reactor | 0.10 | 0.10 | 0.10 | 0.020 | 0.20 |
| Run Time (Minutes) | 15.0 | 15.0 | 3.8 | 15 | 15 |
| Polymer Yield (mg) | 61 | 84 | 194 | 70 | 97 |
| Activity (mg polymer per μmol Hf per minute) | 41 | 56 | 506 | 230 | 32 |
| mol percent total styrene by FTIR (linear regression) | 8.2 | 5.0 | 2.6 | 3.4 | 5.6 |
| Mw by GPC | 6800 | 3200 | 8000 | 5500 | |
| Mw/Mn by GPC | 1.5 | 1.2 | 1.6 | 1.4 | |

As described above, embodiments of the invention provide a number of useful articles of manufacture, including but not limited to, waxes, lubricants, additives, processing aids, etc. The waxes may be used to formulate paints and coatings, printing inks, carbon paper, photo toners, building and construction materials, mold release agents, hot melt adhesives, candles. The waxes may also be used in wood processing, metal working, powder metallurgy and sintering, wax modeling, sizing, crop protection, and so on.

While the invention has been described with respect to a limited number of embodiments, these embodiments are not intended to limit the scope of the invention as otherwise described and claimed herein. Variations and modifications therefrom exist. The appended claims intend to cover all such variations and modifications as falling within the scope of the invention.

The invention claimed is:

1. An article of manufacture, comprising:
a linear copolymer of ethylene and vinyl aromatic monomer having a weight average molecular weight of less than 15,000, wherein the copolymer is characterized by a backbone having a first and second terminal end group, the first terminal end group is a methyl group, the second terminal end group is a vinyl group, wherein the ratio of the terminal methyl group to the terminal vinyl group is 0.8:1 to 1:0.8.

2. The article of manufacture of claim 1, wherein the backbone of the copolymer is substantially free of a vinylidene group.

3. The article of manufacture of claim 1, wherein the article is a wax.

4. The article of manufacture of claim 1, wherein the article is a hot melt adhesive.

5. The article of manufacture of claim 1, wherein the article is an electrostatic toner.

6. The article of manufacture of claim 1, wherein the article is a lubricant.

7. The article of manufacture of claim 1, wherein the copolymer includes a functional group.

8. The article of manufacture of claim 7, wherein the functional group is a halogen, hydroxyl, anhydride, amine, amide, carboxylic acid, ester, ether, or nitrile group.

9. A method of functionalizing a polymer, comprising:
obtaining a linear copolymer of ethylene and vinyl aromatic monomer having a weight average molecular weight of less than 15,000, the copolymer being characterized by a backbone having a first and second terminal end group, the first terminal end group being a methyl group, the second terminal end group being a vinyl group, wherein the ratio of the terminal methyl group to the terminal vinyl group is 0.8:1 to 1:0.8; and
effectuating functionalization of the vinyl group to make a functionalized copolymer.

10. The method of claim 9, wherein the functionalization is chlorination.

11. The method of claim 9, wherein the functionalization is epoxidation.

12. The method of claim 9, wherein the functionalization is oxidation.

13. The method of claim 9, wherein the functionalization is carboxylation.

14. The method of claim 9, wherein the functionalization is sulfonation.

* * * * *